(12) United States Patent
Bilsky

(10) Patent No.: US 12,275,143 B2
(45) Date of Patent: Apr. 15, 2025

(54) SEGMENTED ROBOT

(71) Applicant: FLX Solutions Inc., Bethlehem, PA (US)

(72) Inventor: Matthew Bilsky, Oreland, PA (US)

(73) Assignee: FLX Solutions, Inc., Bethlehem, PA (US)

( * ) Notice: Subject to any disclaimer, the term of this patent is extended or adjusted under 35 U.S.C. 154(b) by 119 days.

(21) Appl. No.: 18/011,547

(22) PCT Filed: Jun. 24, 2021

(86) PCT No.: PCT/US2021/038804
§ 371 (c)(1),
(2) Date: Dec. 20, 2022

(87) PCT Pub. No.: WO2021/262924
PCT Pub. Date: Dec. 30, 2021

(65) Prior Publication Data
US 2023/0258251 A1 Aug. 17, 2023

Related U.S. Application Data

(60) Provisional application No. 63/043,483, filed on Jun. 24, 2020.

(51) Int. Cl.
*B25J 9/10* (2006.01)
*B25J 9/12* (2006.01)
*F16H 37/12* (2006.01)

(52) U.S. Cl.
CPC ............... *B25J 9/106* (2013.01); *B25J 9/102* (2013.01); *B25J 9/126* (2013.01); *F16H 37/122* (2013.01)

(58) Field of Classification Search
CPC ... B25J 9/065; B25J 9/101; B25J 9/102; B25J 9/105; B25J 9/106; B25J 9/109; B25J 9/126; F16H 37/122
See application file for complete search history.

(56) References Cited

U.S. PATENT DOCUMENTS

2017/0266806 A1* 9/2017 Radin ................... B25J 9/126
2019/0070726 A1 3/2019 Bilsky

OTHER PUBLICATIONS

PCT/US2021/038804 International Search Report. Mailed Oct. 21, 2021.
PCT/US2021/038804 Written Opinion. Mailed Oct. 21, 2021.

* cited by examiner

*Primary Examiner* — Joseph Brown
(74) *Attorney, Agent, or Firm* — Joseph E. Maenner; Maenner & Associates, LLC

(57) ABSTRACT

A robot includes a first link having a first longitudinal axis operatively coupled to a second link having a second longitudinal axis such that rotation of the first link relative to the second link alternatively performs the following effects: elongation of the first link; pivoting of the first longitudinal axis relative to the second longitudinal axis; and rotation of the first longitudinal axis relative to the second longitudinal axis.

13 Claims, 44 Drawing Sheets

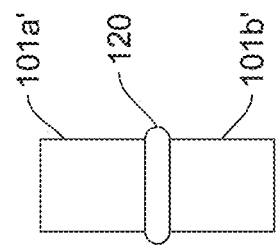
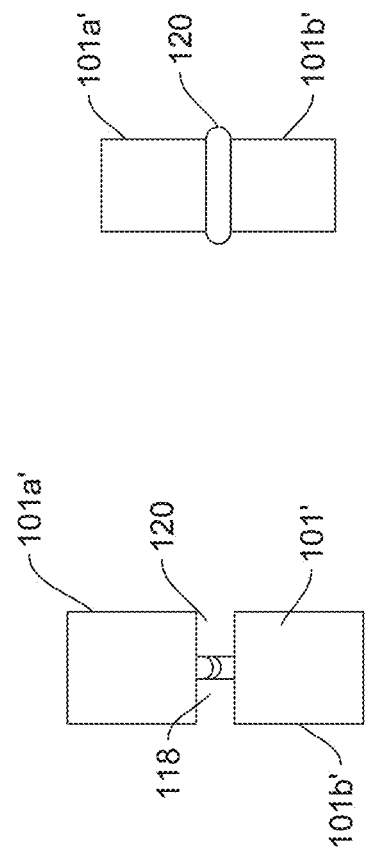
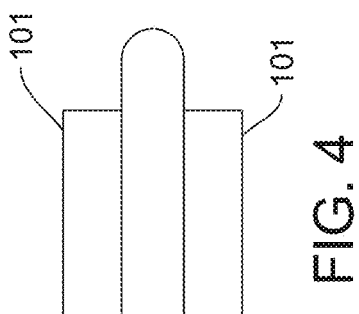
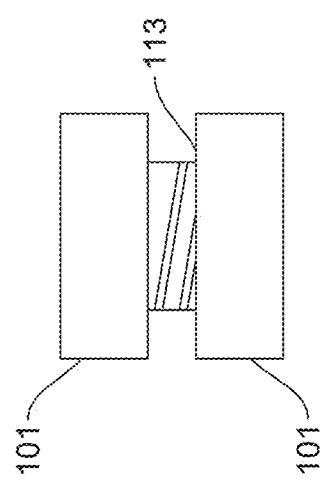
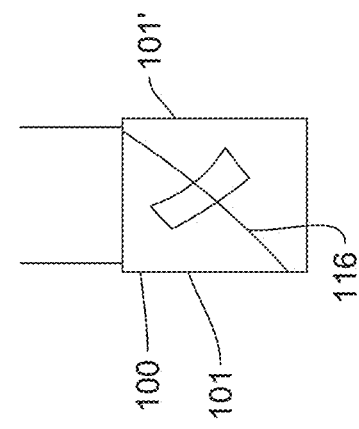

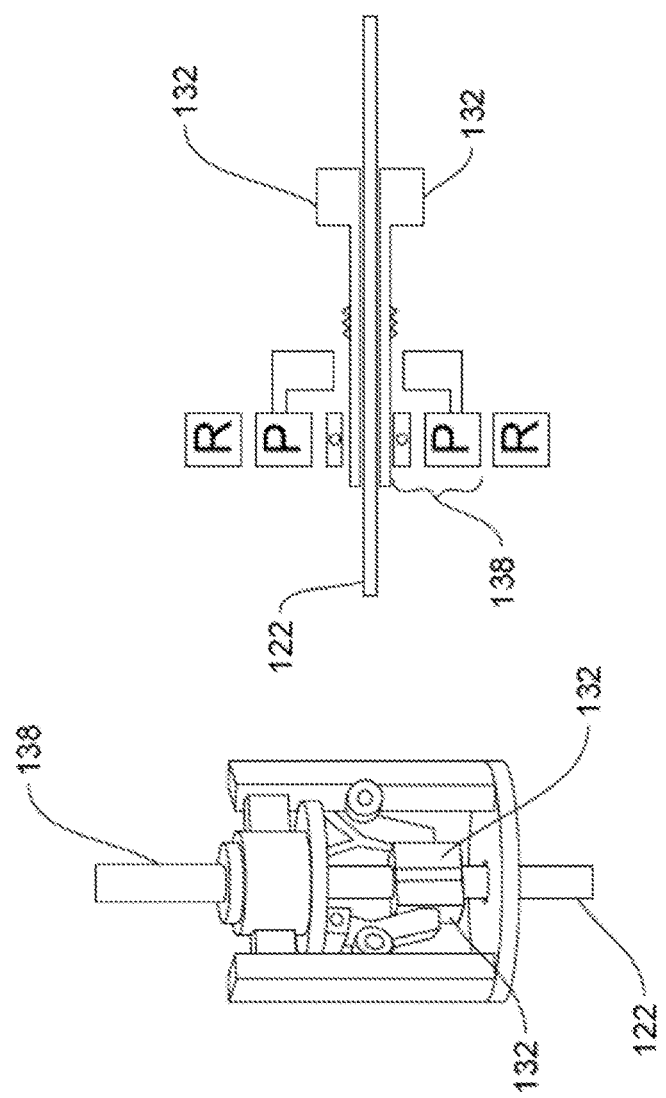
FIG. 13
FIG. 12
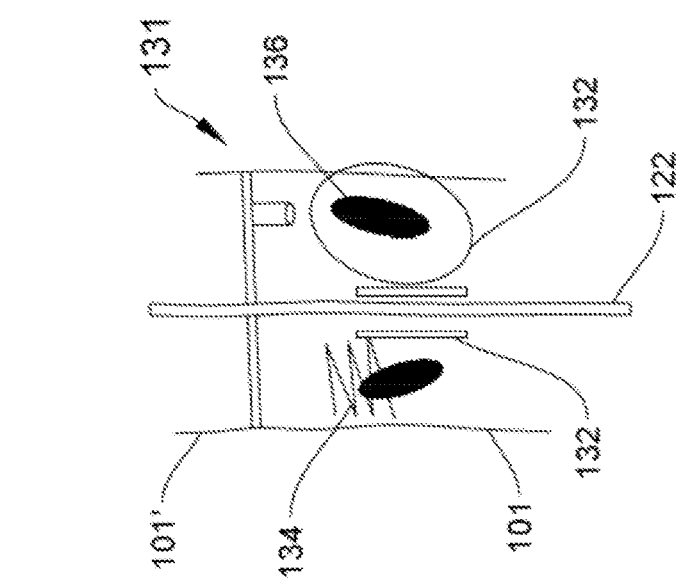
FIG. 11

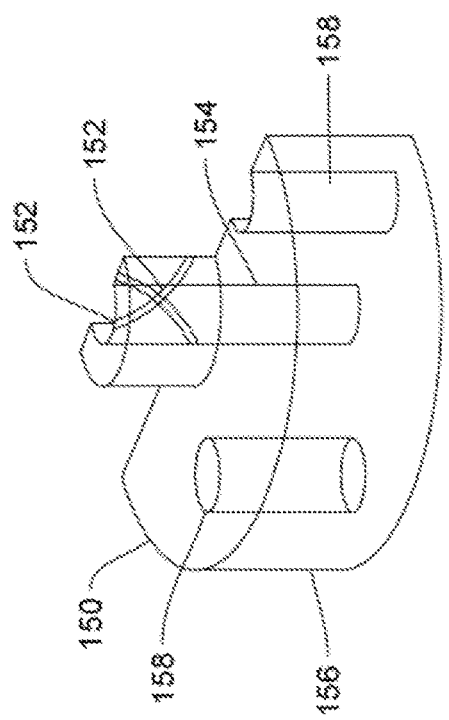
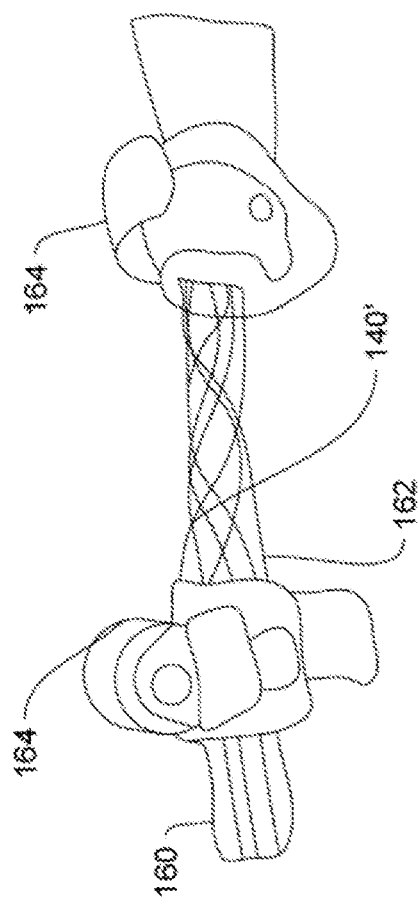
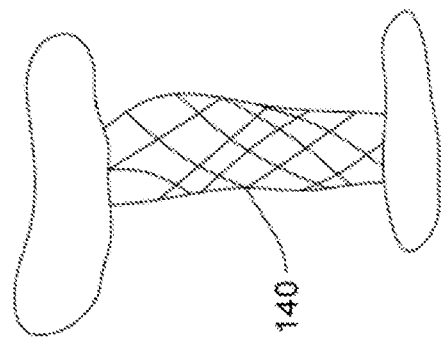

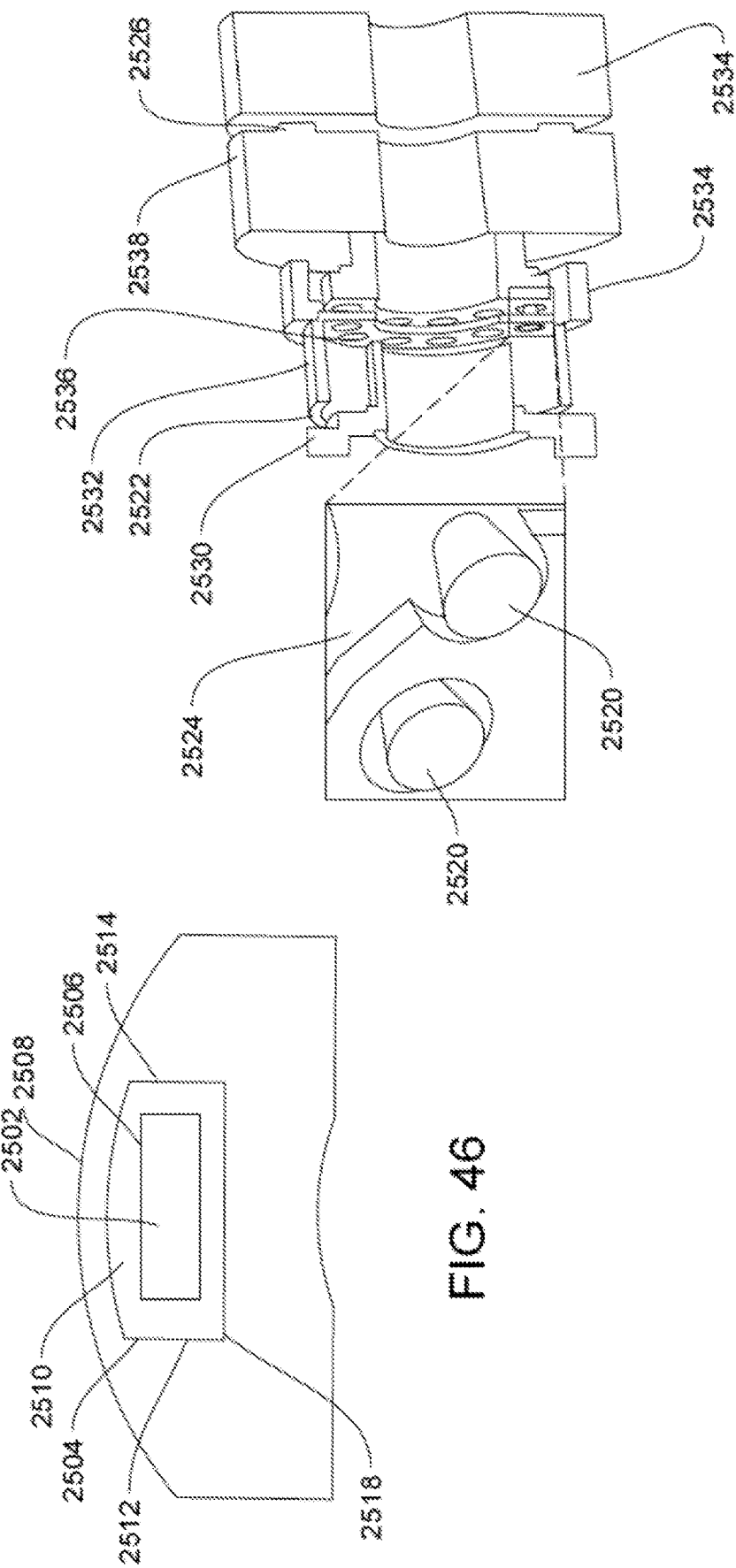

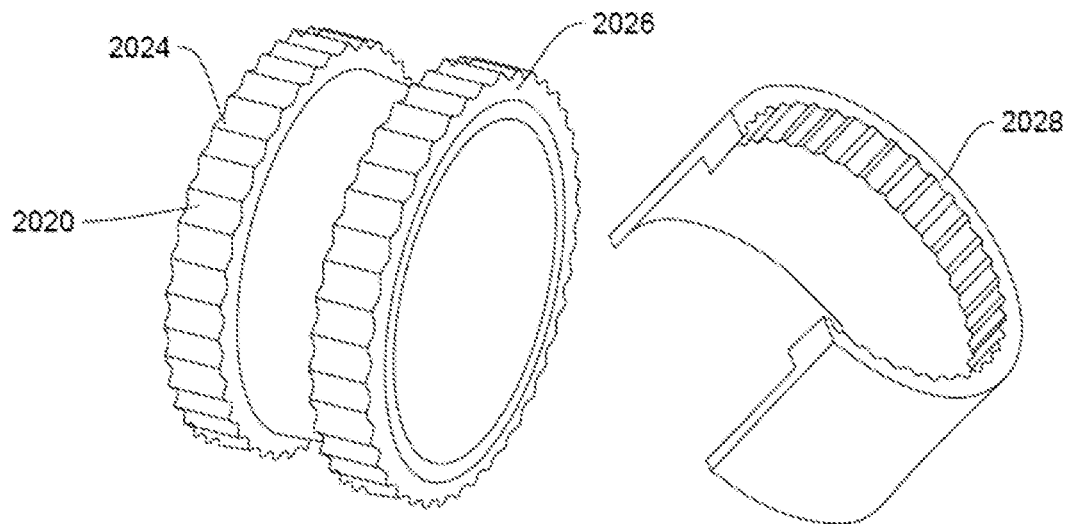
FIG. 57
FIG. 58
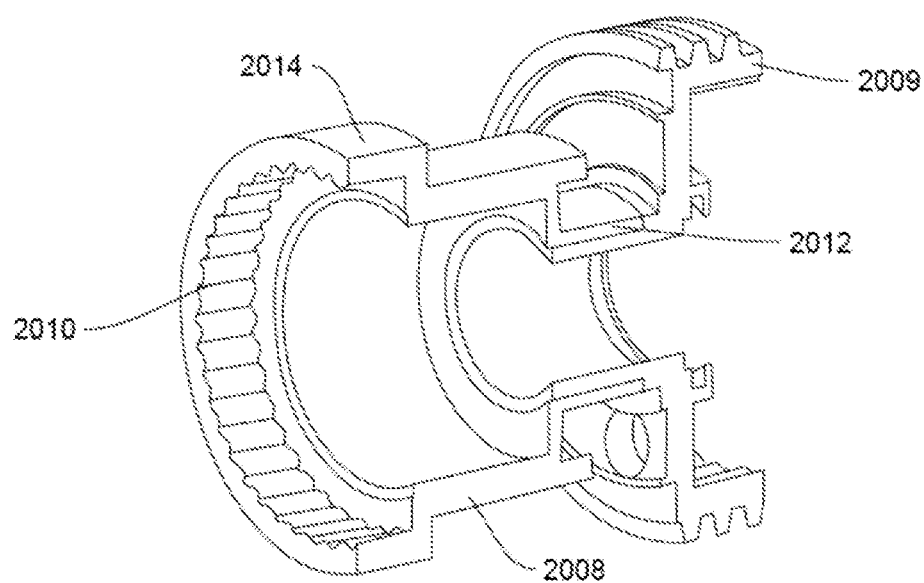
FIG. 59
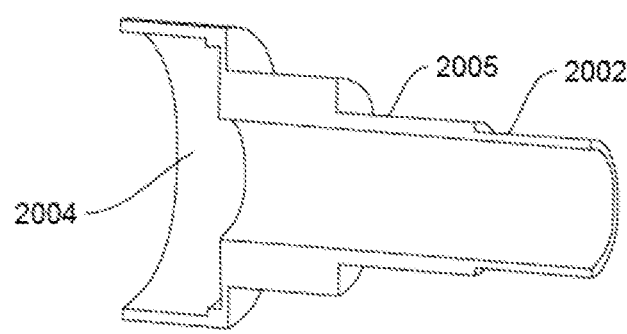
FIG. 60

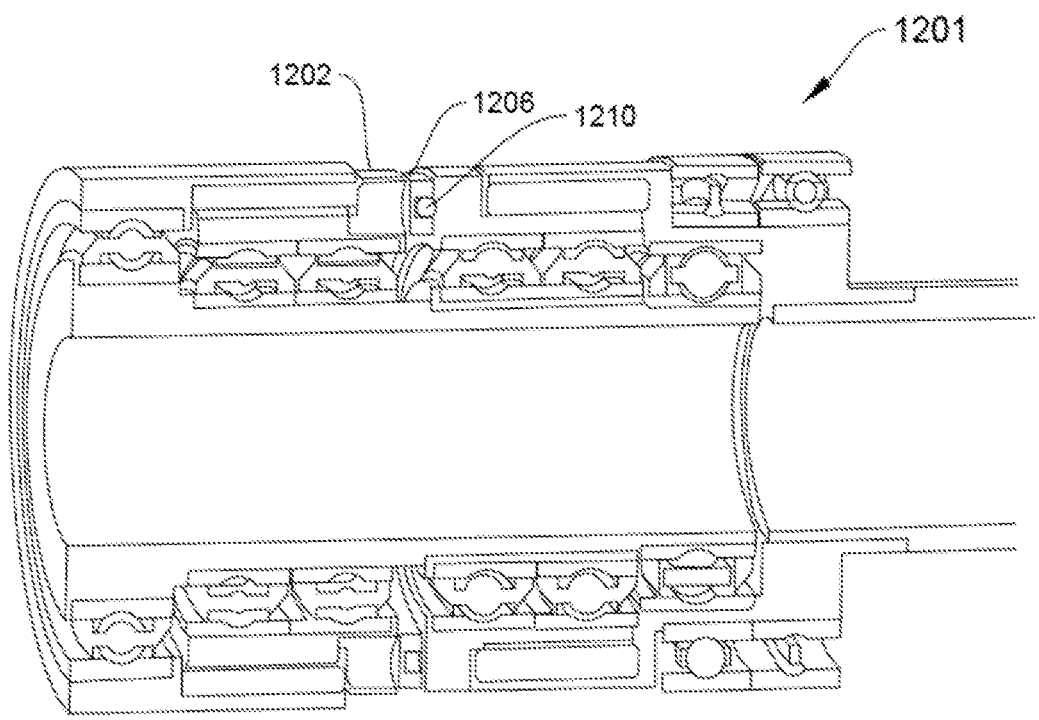
FIG. 64
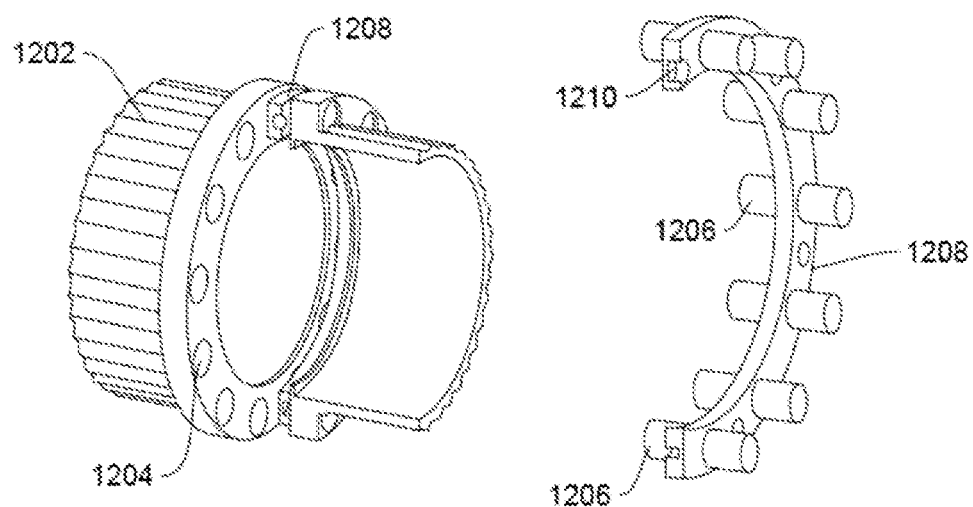
FIG. 65
FIG. 66

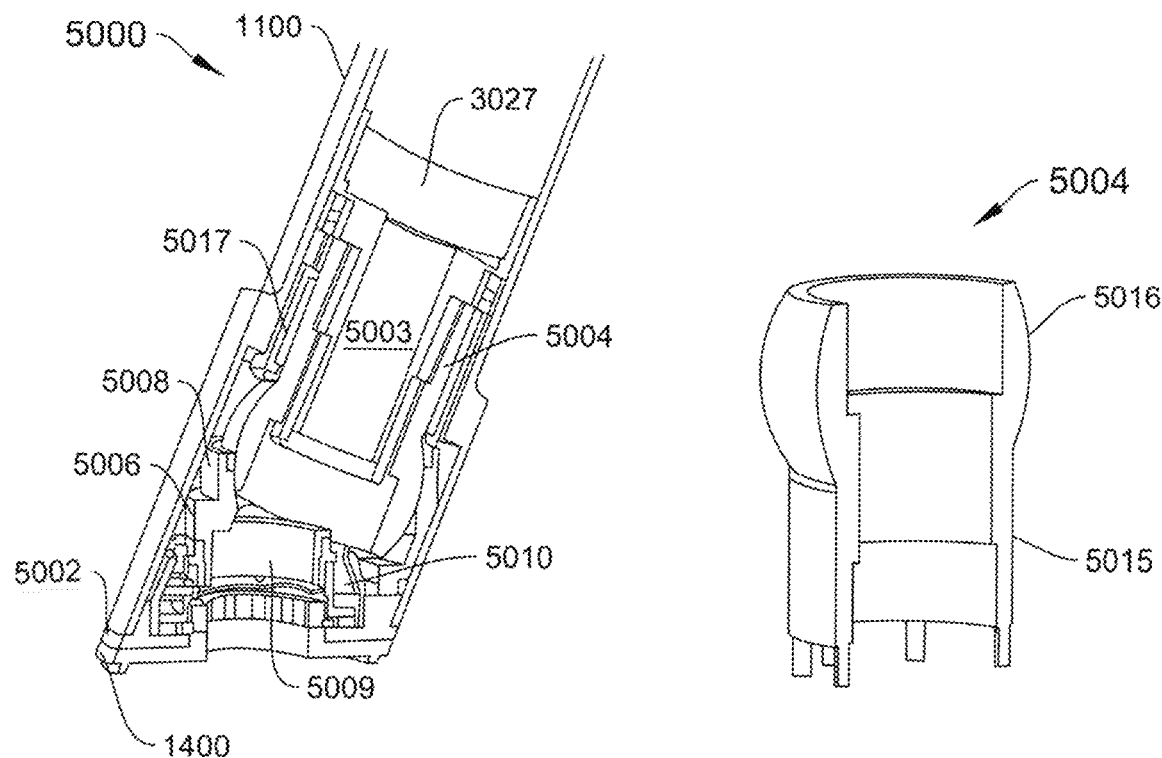
FIG. 67
FIG. 68
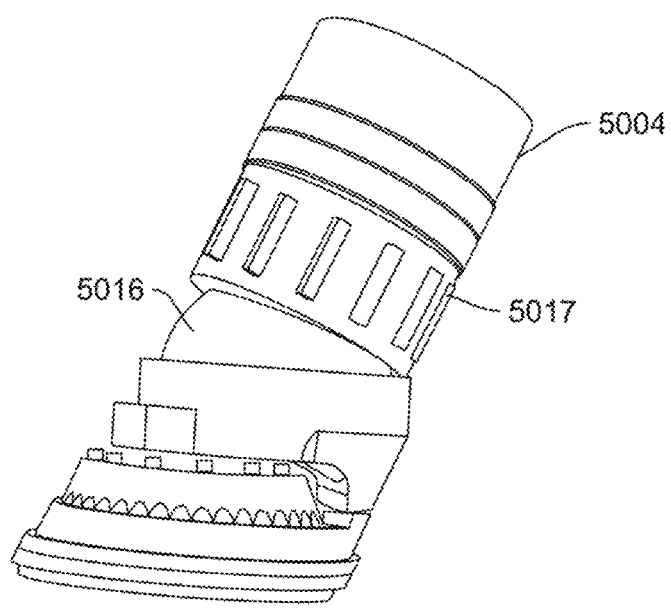
FIG. 69

SEGMENTED ROBOT

BACKGROUND OF THE INVENTION

Field of the Invention

The invention relates to a robot that can maneuver inside a wall or other confined space.

Description of the Related Art

When a new house is built, all necessary electrical, plumbing, etc. are run prior to closing up the walls. This is fittingly referred to as new work electrical. The unrestricted access to the wall makes the installation of these systems a trivial exercise for the seasoned vocational worker. Likewise, once the drywall or plaster has been hung making changes within the walls becomes exponentially more difficult. Routes must be planned to minimize the number of access holes cut in the wall face. A sense of how homes are put together becomes a pre-requisite to tactfully complete a project in a minimally invasive manner. This art is known as old work electrical.

It would be beneficial to develop a drilling device that can bore holes through structural members as well as to run flexible conduits through the structural members without having to cut holes in the walls to do so.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In one embodiment, the present invention provides a linear and rotational actuator assembly in a robot link. The robot has a plurality of links operationally attached to at least one other of the plurality of links. The assembly comprises an elongate hollow inner body extending along a central longitudinal axis and an elongate hollow outer body disposed at least partially around the inner body and extending along the central longitudinal axis. The outer body has a generally planar end face extending obliquely relative to the central longitudinal axis. A single motor is configured to both rotate and extend the outer face relative to the body inner body and to lock out rotational motion of the outer body with respect to the inner body when the assembly is configured for drilling.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

FIG. 3 is a schematic view of a power screw used to operate a link in the robot of FIG. 1;

FIG. 4 is a schematic view of a bladder used to brace a link in the robot of FIG. 1 inside of a wall;

FIG. 5 us a schematic view of a linkage used to rotate a link in the robot of FIG. 1;

FIG. 6 is a schematic view of a linear actuator used to operate a link in the robot of FIG. 1;

FIG. 7 is a schematic view of the link of FIG. 6 with the linear actuator retracted;

FIG. 11 is a schematic view of an exemplary gripper linkage and actuator used with the robot of FIG. 1;

FIG. 12 is a perspective view of a gripper linkage and actuator;

FIG. 13 is a schematic view of a gripper and planetary train;

FIG. 14 is a perspective view of a wire braid for use to grip an actuator;

FIG. 15 is a perspective view, in section, of a jig used to manufacture a wire braid;

FIG. 16 is a perspective view of an alternative embodiment of a wire braid used to grip an actuator;

FIG. 46 is a top plan view of a key mechanism providing translation but not rotation relative to the face and cycloid housing in the link of FIG. 33;

FIG. 47 is a perspective view, in section of an integrated lock/unlock mechanism design on single stage conventional cycloid used in the link of FIG. 33;

FIG. 57 is a perspective view of a cycloid rotor used in the robot of FIG. 55;

FIG. 58 is a perspective view, in partial section, of cycloid housing used in the robot of FIG. 55;

FIG. 59 is a perspective view, in section, of a screw assembly used in the robot of FIG. 55;

FIG. 60 is a perspective view, in section, of a motor input used in the robot of FIG. 55;

FIG. 64 is a perspective view, in section, of an embodiment of a rotor shaft with bearings used in the robot of FIG. 55;

FIG. 65 is a side elevational view, in section, of a cycloid assembly used in the robot of FIG. 55;

FIG. 66 is a side elevational view, in section, of a ring used in the robot of FIG. 55;

FIG. 67 is a perspective view, in section, of a pin actuator used in the robot of FIG. 55;

FIG. 68 is a perspective view, in section, of a shaft used in the actuator of FIG. 67;

FIG. 69 is a perspective view of the actuator of FIG. 67;

DETAILED DESCRIPTION

Figure 2:
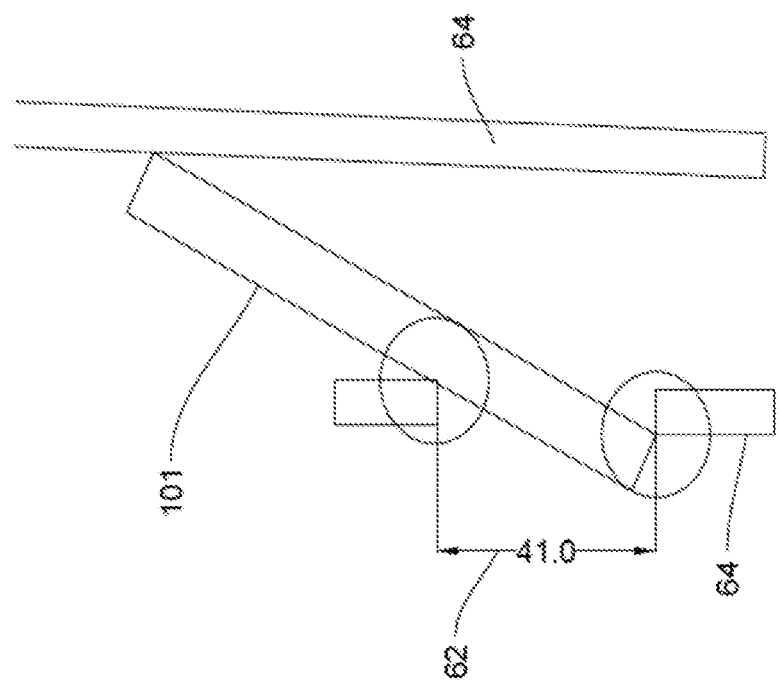
FIG. 2 shows an exemplary calculation to determine an optimum length of a link in the robot of FIG. 1 to determine the ability to insert the robot into a U.S. standard framed wall.

In the drawings, like numerals indicate like elements throughout. Certain terminology is used herein for convenience only and is not to be taken as a limitation on the present invention. The terminology includes the words specifically mentioned, derivatives thereof and words of similar import. The embodiments illustrated below are not intended to be exhaustive or to limit the invention to the precise form disclosed. These embodiments are chosen and described to best explain the principle of the invention and its application and practical use and to enable others skilled in the art to best utilize the invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

The word "about" is used herein to include a value of +/−10 percent of the numerical value modified by the word "about" and the word "generally" is used herein to mean "without regard to particulars or exceptions."

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Unless explicitly stated otherwise, each numerical value and range should be interpreted as being approximate as if the word "about" or "approximately" preceded the value of the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence.

U.S. patent application Ser. No. 17/091,391, filed on Nov. 6, 2020, and owned by the present applicant, is incorporated herein by reference in its entirety.

A robot 100 is provided that can be used to operate in confined spaces. Robot 100 can be used to drill holes, scan and take pictures and/or video the interior of a space, or other suitable tasks that may be difficult, if not impossible, to presently perform.

It is desired that robot 100 is able to drill through wooden structural members in a typical wood frame building. To be efficient, robot 100 also needs to drill through a standard 2×4-inch (5×10 cm) stud without the need to clear a drill bit 110 at a distal end 102 of robot 100. Furthermore, it is also desired to constrain the maximum diameter of robot 100. A 1-inch (2.5 cm) drill bit is the most commonly used diameter for running wires across studs and joists. The length and shape of robot 100 must be such that robot 100 can be operated completely from outside the wall. Only holes for newly installed electrical upgrades (i.e. an outlet or light sized hole) need to be drilled at either end of the run.

Figure 1:
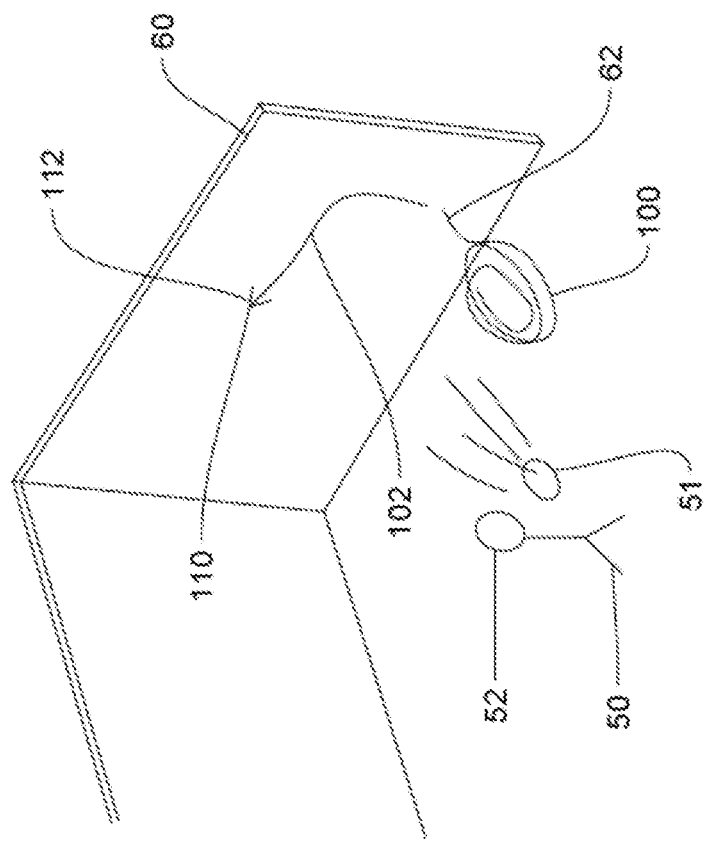
FIG. 1 shows a schematic view of a robot according to an exemplary embodiment of the present invention drilling into a wall.

The conceptual design shown in FIG. 1 depicts an exemplary use of robot 100. Robot 100 is constructed from a series of interconnected, yet independent links 1100, 1400 (shown in FIGS. 19 and 20), that can rotate about each other and extend independently of each other to advance robot 100 through an enclosed space, such as a typically wood-framed wall.

An electrician 50 remotely operates robot 100 that is inserted through an electrical outlet-sized hole 62 in a wall 60. Robot 100 then proceeds to bend and move through the wall 60, drilling through studs encountered along the path. A map of obstacles can be created using a scanner 112 in distal end 102 of robot 100. The image generated by the scanner 112 is then be projected onto the wall 60 by a projector 51 or special glasses 52 that would help the electrician 50 navigate robot 100 through wall 60 while also displaying the current position of robot 100 within wall 60.

Position display of distal tip 102 of robot 100 reduces the likelihood of inadvertently drilling through pipes or wires inside wall 60. Optionally, distal tip 102 also includes a jettisoning device (not shown) for jettisoning drill bit 110 in the event that drill bit 110 becomes jammed inside wall 60.

In an exemplary embodiment, a maximum length rigid link of robot 100 that could be inserted through a standard single gang outlet sized hole (4.1 inches tall) needed to be determined. Using circles to help define the intersection between the 1 inch cylinder of link 101 and wall 60 (FIG. 2), with studs 64 spaced 3.5 inches (8.9 cm) apart, the maximum length was calculated to be 6.19 inches (15.7 cm). This assumes the outer covering is 0.75 inches (1.9 cm) thick.

This use of robot 100 only requires two external holes to be cut in the wall; one at each end. The design of the robot 100 is such that these holes are cut to the size of the electrical boxes 62 that will be used. This will eliminate the need for any patching and painting usually associated with the old work electric trade. Exemplary embodiments of mechanisms that can be used to manipulate links 101 relative to each other are shown in FIGS. 3 and 4. In FIG. 3, a lead screw system 113 that uses counter-rotation to expand and contract. FIG. 4 shows an air-powered bladder 114 that tilts and extends like the cartilage of a human spine by varying the pressure to either side. Bladder 114 also can also expand to brace within existing or newly drilled holes for locomotion or withstanding high load operations.

Referring to FIG. 5, an exemplary structure of robot 100 is a pair of rotational links 101 connected by another type of link 101' that could both extend axially and expand radially to use previously drilled holes for advancing the drill bit 110. The rotational links 101, 101' would have faces angled faces with a pin extending through their centers to connect them. Rotation about this pin causes the links 101, 101' to "bend" relative to each other by forming an angle 116 between their cylindrical bodies. Each extending link 101a', shown in FIGS. 6 and 7, would have a linear actuator 118 that would extend/contract a first portion 101a' from a second portion 101b'. At the base of the actuator 118 is a flexible membrane ring 120 with the same outside diameter as the link's body (1 inch) when uncompressed. Further axial contraction of the extending link 101' would cause the membrane 120 to bow outward allowing membrane 120 to brace in a previously drilled hole.

Alternative methods of transmitting power include running pneumatic and hydraulic lines (not shown) through the entire robot 100. These lines also would require a motor be placed in the drill bit 110 only powered by fluid pressure rather than electrical energy.

Figure 8:
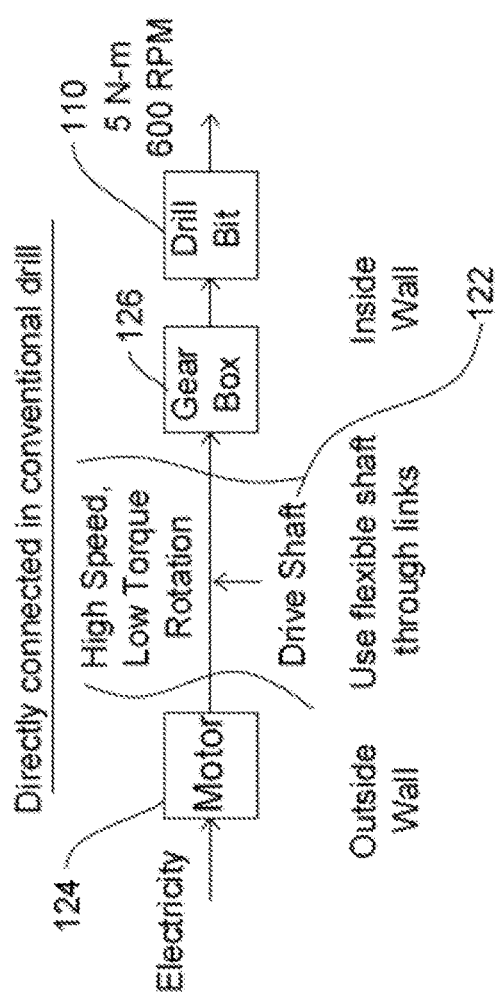
FIG. 8 is a schematic view of a drive shaft used to operate the robot of FIG. 1.

To eliminate the use of fluid power to operate drill bit 110, a flexible drive shaft 122 was identified as a possible solution commonly used in a variety of machines such as rotary tools and lawn string trimmers. Referring to FIG. 8, a large motor 124 is placed outside the wall 60 and flexible shaft 122 routed through the entire robot 100 that spins at high speeds. Shaft 122 is geared down using a gear box 126 at the distal end 102 of the robot 100 for drilling.

Furthermore, a method to keep the robot 100 rigid as robot 100 braced while drilling also needs to be integrated. A mechanism is developed to grip the flexible drive shaft 122 intermittently allowing shaft 122 to actuate the links 101, 101'.

Figure 9:
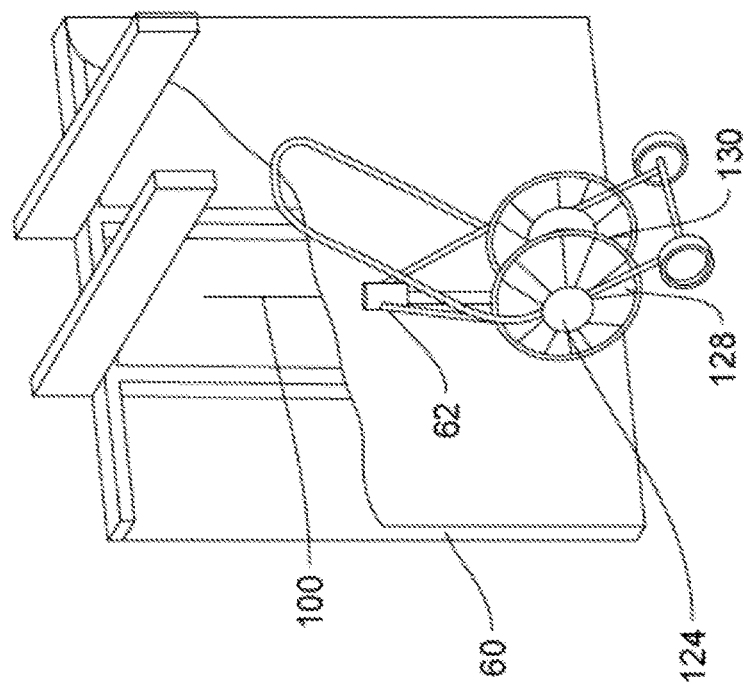
FIG. 9 is a perspective view of an external housing concept used with the robot of FIG. 1.

Referring to FIG. 9, robot 100 requires a method of getting robot 100 to and from the job site and feed robot 100 in and out of the wall 60. This is by a base station 128 that also houses the large motor 124 responsible for powering the flexible drive shaft 122. Base station 128 also houses the main computer (not shown) for the robot 100 and converts AC power to DC for robot 100. A device 130, similar to a hose reel, can hold and feed out the links 101, 101'.

Figure 10:
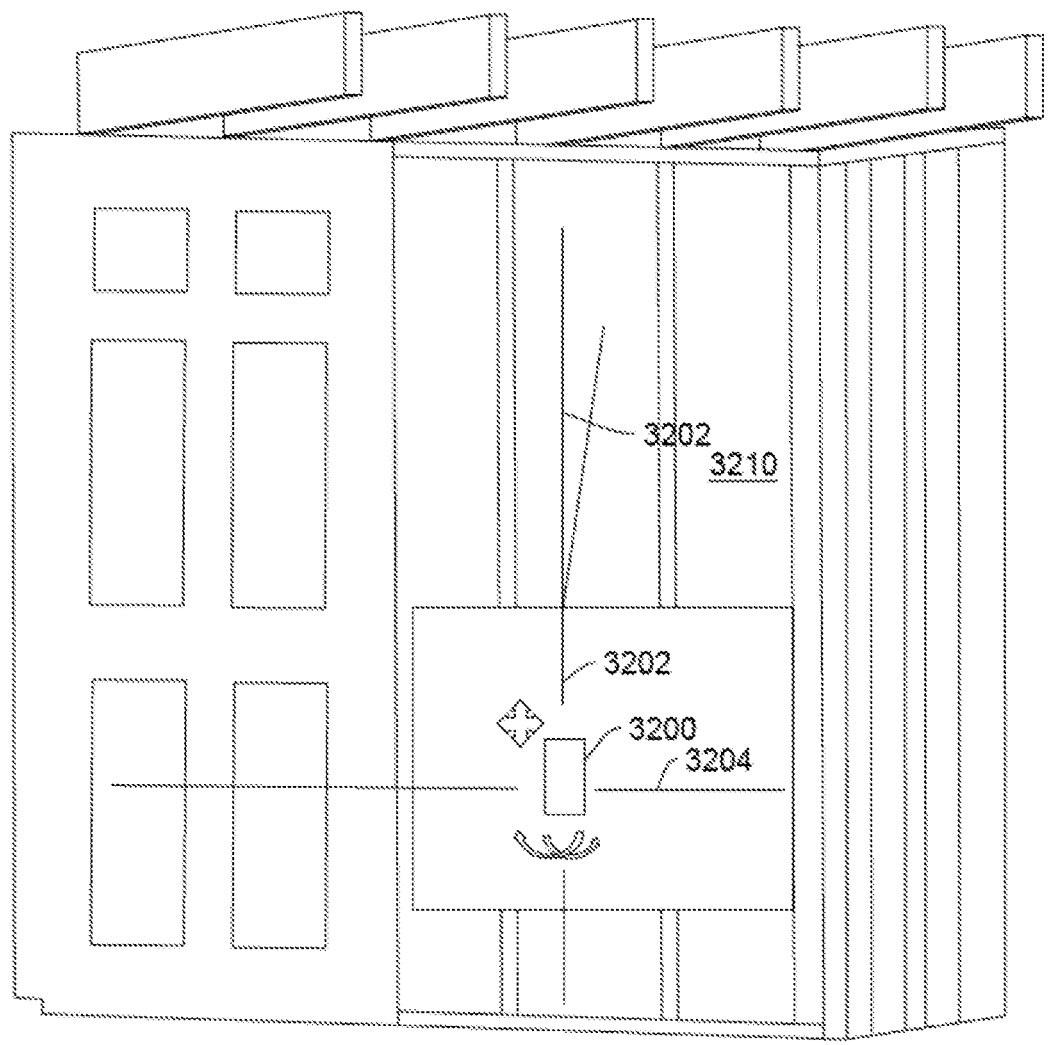
FIG. 10 is a schematic view of a wall scanner used with the robot of the present invention.

Optionally, a wall scanning system can be part of the robot's user interface. While stud finders are the most commonly used tool to search for obstacles within a wall, stud finders cannot typically sense through plaster and lathe nor detect plastic piping, which is quickly replacing copper as the standard piping in walls. Referring now to FIG. 10, a radar mapping system 3200 that uses all penetrating radio frequency to determine the location of objects that are orthogonal to system 3200 (lines 3202, 3204). A distance measuring system locates the objects in two- and three-dimensions within a space 3210. Mapping system 3200 can rotate about three orthogonal axes (x, y, and z) to allow mapping system 3200 to map at angles (not just orthogonally) along the entirety of space 3210.

The generated image provides the location of all studs, joists, and obstacles on a 3D map of the room. A user then identifies the safe locations they wished to drill on the map and the robot then carries out the actions.

Additionally, it is desired that the robot is that it will be able to see inside walls. To accomplish this a camera can be mounted within the drill head 110, as there is no extra room inside the links. A processor associated with the camera can would also fit within the drill head 110 or, alternatively, a wireless module can be provided to transmit the data back to the central controller.

An exemplary camera can be the CMDX-15 produced by RF-Links.com. The entire camera and transmitter are contained within a 0.3 inch×0.19 inch×0.2 inch (0.76 cm×0.48 cm×0.5 cm) package, which is incredibly small, and can fit within the current drill head design. LED lights and specialty lenses can also be implemented to improve image quality and field of view. A mechanism to allow the camera to extend from robot 100 can also be implemented to improve the field of view.

To eliminate the need for rotation motors in each link 101, 101', a system 131 to grab and use the drive shaft 122 to rotate the link 101 was developed and is shown in FIGS. 11-13. While the robot 100 travels through the wall 60, the drive shaft 122 is spun at a slow speed for a gripper 132 to safely grab the shaft 132. Faces of links 101, 101' do not need to be adjustable during drilling, thereby alleviating concerns of damaging the shaft 122 by grabbing shaft 122 at high speeds. This arrangement locks out motion between links 101, 101'with enough strength to resist drilling and bracing forces.

System 131 uses a linear actuator 134 that moves vertically and activate grippers 132 through a linkage 136 that radially moves to grab the drive shaft 122 The gripper 132 also has gear/spline teeth than can engage the sun or planetary carrier of a planetary gear train 138, shown in FIG. 12. Bi-directional output can be achieved by moving the gripping mechanism 131 axially while also engaging the drive shaft 122. If the gripper's teeth engage both the sun and carrier simultaneously, then motion would be locked out. Various gripping methods can be used.

One gripping method uses a braid 140, shown in FIG. 14, configured to act similar to the known Kellams braid Ideally the braid 140 would interlock mechanically with the shaft's strands utilizing both interference and friction to grip the shaft 122 against higher loads.

A first embodiment of a wire rope braid 140 is shown in FIG. 14. A jig 150 for making a wire braid is shown in FIG. 15. Jig 150 has helical slots 152 cut along the periphery to guide and hold wires for braid 140 at 60° angles. A 0.2 inch (0.5 cm) hole 154 in the center of jig 150 is provided to ensure that braid 140 would clear the shaft 122 when open. Along the edge 156 of jig 150 are holes 158 for pins to hold the top and bottom anchor in line.

An alternative embodiment of an anchor 160 is shown in FIG. 16. Anchor 160 uses a steel mandrel with a paper template on the outside with the wire placements marked. A layer of 3M Very High Bond (VHB) tape 162 was placed around the mandrel 160 and the braid wires were aligned with the template on top of the tape. A second layer of tape 162 was placed over the wires and held them all together with q hose clamp 164 around the circumference. Then the braid was woven using the mandrel 150 of FIG. 15. A similar anchor was created on the other side of the braid. The resulting braid 140', shown in FIG. 16, is a significant improvement on the first braid 140, shown in FIG. 14. The angle and diameter were maintained far better than the free hand prototype.

Figure 18:
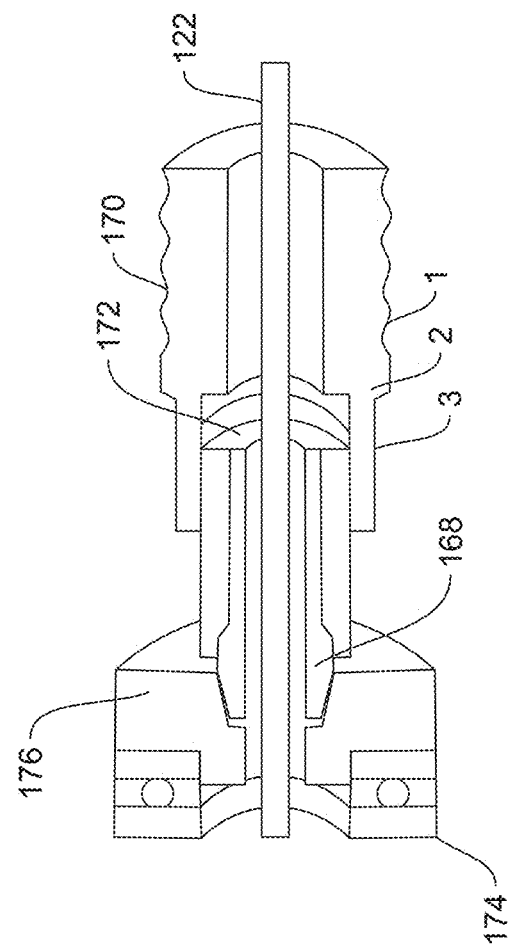
FIG. 18 is a perspective view, in section, of a linear actuation engaging a collet.
Figure 17:
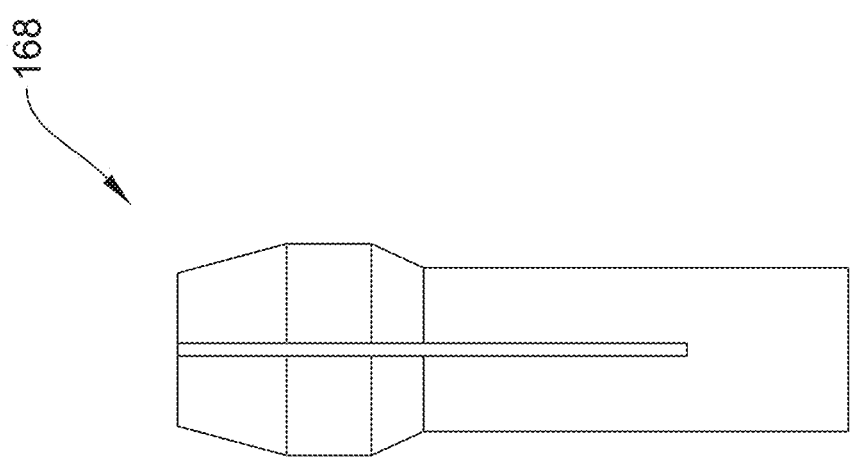
FIG. 17 is a side elevational view of a collet used to grip an actuator.

An alternative embodiment of a gripper for gripping shaft 122 is a collet 168, shown in FIGS. 17 and 18, with a linear actuator 170 to operate collet 168 to releasably grip shaft 122. Linear actuator 170 operates to engage the collet 168 on the shaft 122 and switch between locked, clockwise, and counter clockwise motion. The linear actuator 170 has 3 different positions, as indicated in FIG. 18 (#s 1, 2, 3,). The first position (pictured) is when the collet 168 is disengaged, fully extended, and motion of the attached link 101 is locked out. When the linear actuator 170 moves axially into the second position, the spring 172 is compressed and the planetary gear train is rotationally coupled to the collet 168, allowing the link (not shown) to rotate. The spring 172 is selected such that after being compressed there is still enough force from the linear actuator 170 to also engage the collet 168 onto the drive shaft 122. A thrust bearing 174 supports the sleeve 176 around the collet 168. Advancing the actuator 170 to the third position further compresses the spring 172 while continuing to grip the shaft 122 with the collet 168. This also changes the input of the planetary gear train coupled to the collet 168, thereby reversing the output rotation direction of the mechanism despite the shaft 122 continuing to rotate in the same direction.

In an exemplary embodiment, solenoids can be used due to their simplicity. Alternatively, a donut shaped magnet attached to a plunger or an electromechanical linear actuator to increase the amount of actuation force can be used. Still alternatively, phase change actuators, comprised of wax motors, can be used. The maximum expansion force of wax motors is large enough to either brace or extend for drilling but the actuation speed is significantly slower than a desired time limit. Extending would also be far too slow for drilling purposes. To assist the phase change, Peltier effect mechanisms can be used, which use electricity to pump away heat to a heat sink.

Referring to FIGS. 19-32, a snakelike robot 1000 ("robot 1000") according to an exemplary embodiment of the present invention is shown. Robot 1000 can be used to tunnel through otherwise inaccessible locations, such as, interior walls of buildings, building debris, cave-ins of tunnels or mine shafts, or other such inaccessible locations. A separate locating device can be used to scan a wall (not shown) to determine objects hidden behind the wall, such as, for example, wall studs, electrical junction boxes, electrical/optical cables, fluid pipes, and other devices and structures that may be located behind a wall. Such locating device can provide a three-dimensional map that can be used to guide robot 1000 within the wall.

Robot 1000 can be fitted with distal fittings, such as, for example, drill bits, cameras, sensors, a fluid supply lines such as oxygen, or other types of fittings, as will be discussed in more detail herein. Robot 1000 is constructed from a plurality of linked segments that can operate independently of each other as well as cooperatively with adjacent segments in order to rotate and translate robot 1000.

Alternatively, robot 1000 can be used outside of a confined space and can be used to travel across a surface, stand up vertically, or even operate in the absence of gravity, assuming that at least one point of robot 1000 is anchored to a reference point (i.e. a spacecraft or space station). Additionally, robot 1000 can provide self-locomotion.

Figure 19:
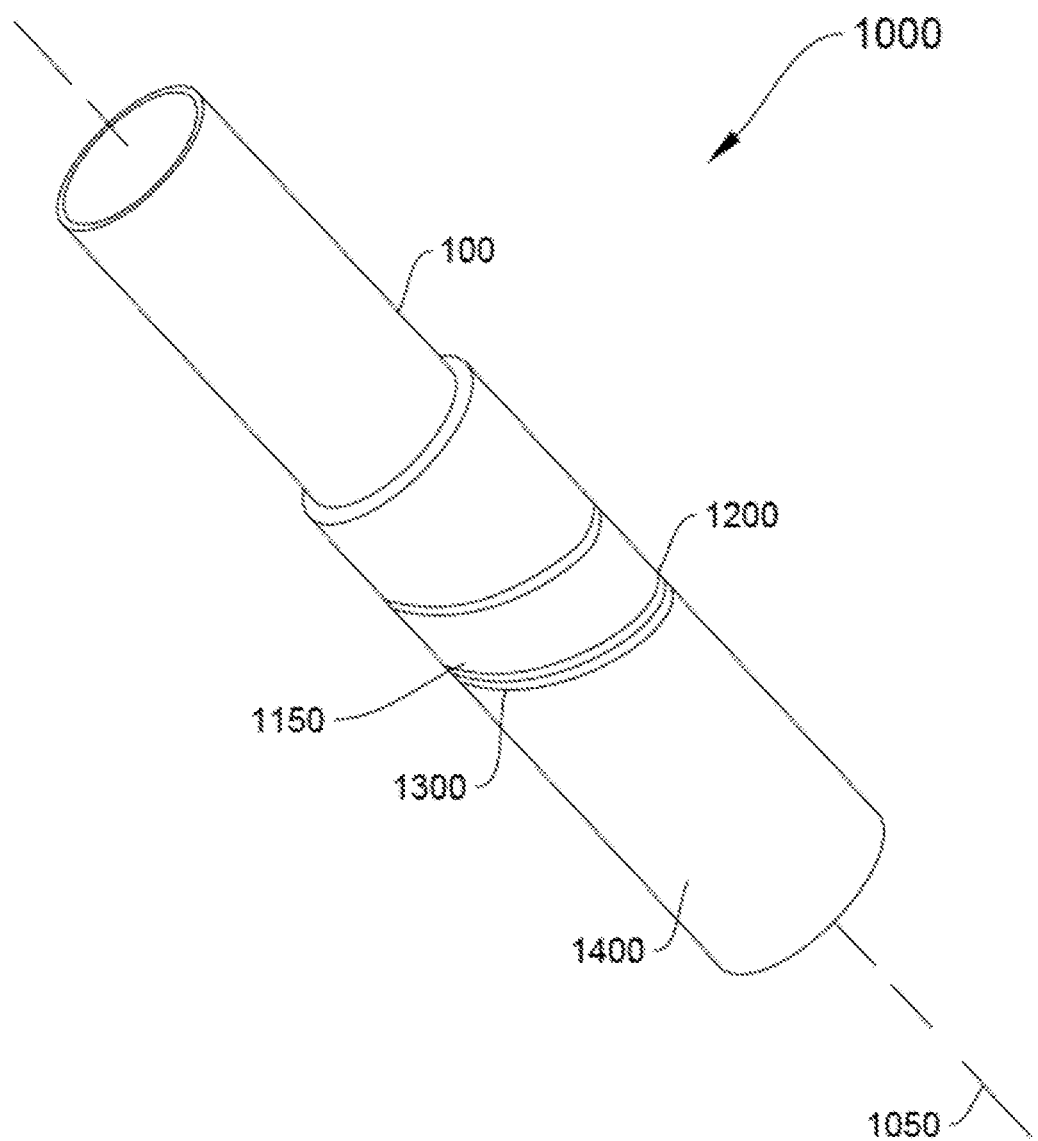
FIG. 19 shows two links of a snake-like robot containing the novel gear train.

FIG. 19 shows an exemplary embodiment of two links 1100, 1400 of robot 1000. Links 1100, 1400 extend along a longitudinal axis 1050. Link 1100 includes a distal face 1200 and link 1400 includes a proximal face 1300 such that distal face 1200 and proximal face 1300 are engaged with each other along a plane 1150. Link 1100 is rotatable relative to link 1400 about plane 1150. While the angle of plane 1150 is shown as about 22.5 degrees relative to longitudinal axis 1050, those skilled in the art will recognize that any finite angle between 0 and 90 degrees inclusive may be selected.

Robot 1000 is operable such that an internal mechanism within links 1100, 1400, is able to rotate link 1100 relative to link 1400 about plane 1150 in the absence of bevel gears.

Figure 20:
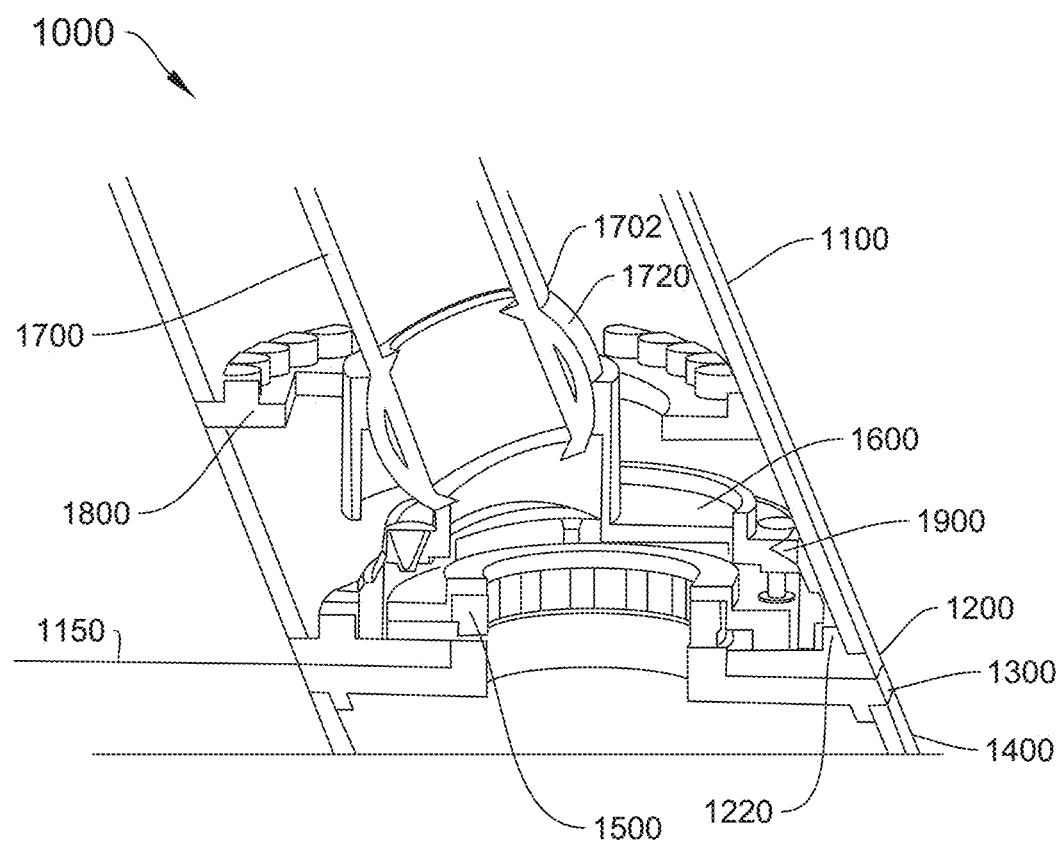
FIG. 20 shows a cross-sectional view of a link in the robot shown in FIG. 19 with details of individual components of gear and rotation system.

FIG. 20 shows a cross sectional view of a 3-dimensional cycloid drive with integrated locking mechanism applied to actuating distal link 1100 relative to proximal link 1400 about plane 1150. Again, while in the current embodiment the aforementioned gear train and locking system have been applied to robotic joint actuation, those skilled in the art will recognize that the inventive drive may also be employed in any situation in which it is necessary to transmit power from one plane to another. Furthermore, in the exemplary embodiment, the intersection of the axes about which rotation is occurring does not necessarily need to intersect at a point within the mechanism. While a solution to be described herein has been devised and implemented to correct this, the trivial case where the two axes intersect at the point of action may also be implemented using this design.

FIG. 20 also shows the constituent parts of the inventive 3-dimensional cycloid drive with integrated locking mechanism. An input shaft 1700 has a proximal end 1702 with an eccentric sphere 1720 (shown in detail in FIG. 21). Sphere 1720 drives an eccentric input disk 1600 that is inserted inside and interacts with a cycloid rotor 1900. Pins 1560 on curvic output disk 1500 (shown in detail in FIGS. 30 and 31) interact with a cycloid rotor 1900 while also selectively engaging teeth 1240 on distal face 1200 (shown in detail in FIGS. 26 and 27) and proximal pin face 1300. A keyed disk 1800 in link 1100 is used to maintain alignment of eccentric input disk 1600 within link 1100.

Figure 21:
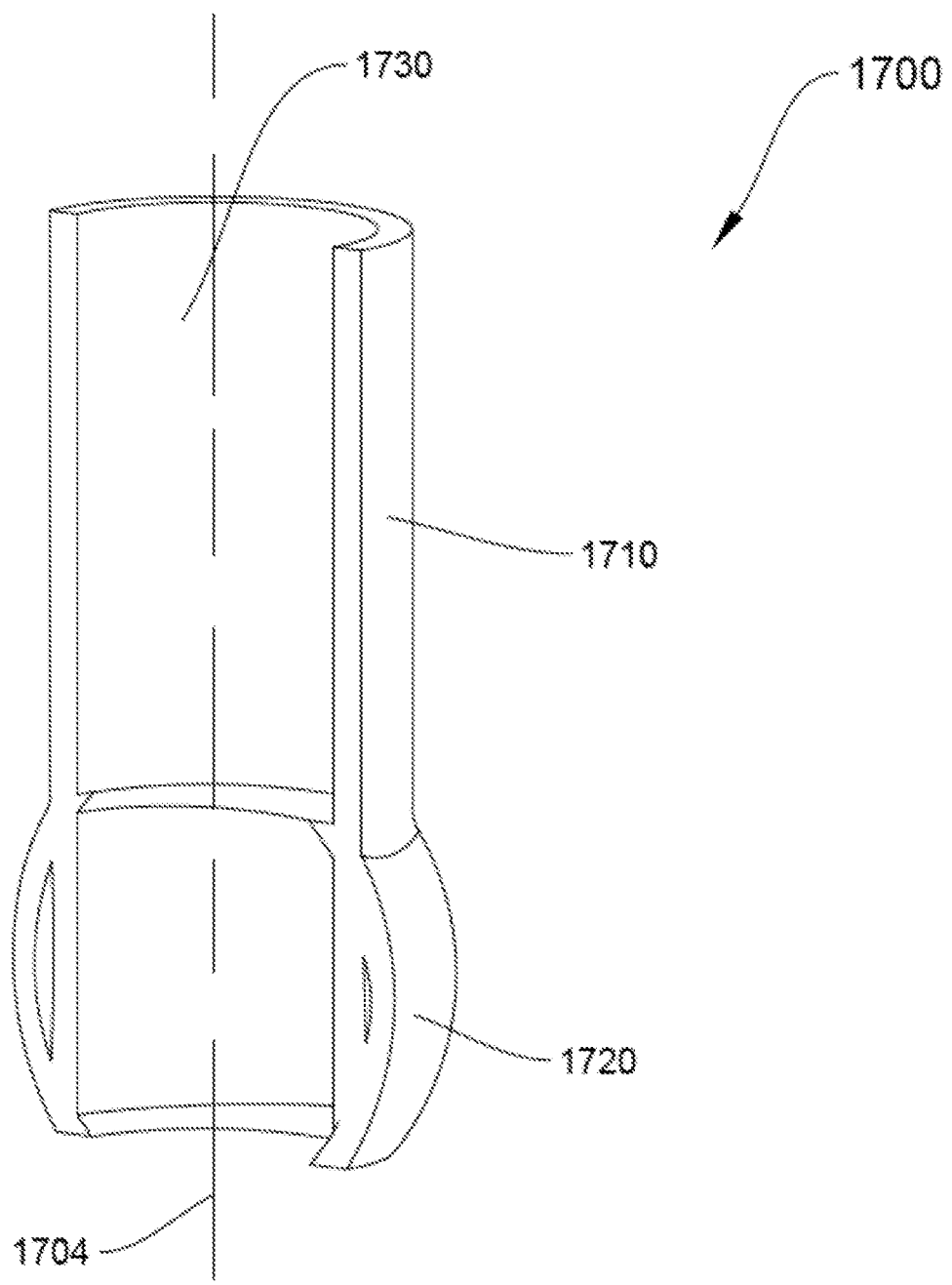
FIG. 21 shows a cross section view of the input to the drive train from a rotational power source.

FIG. 21 shows primary parts of input shaft 1700. Shaft 1700 includes a longitudinal axis 1704 extending centrally therethrough. Shaft 1710 receives rotational power from a distal source (not shown), which can be an electric motor, a hand-operated crank, or other suitable mechanism for providing rotational power. A hollow cavity 1730 is maintained throughout the length of shaft 700. Cavity 1730 allows for the passage therethrough of other elements such as, for example electrical, gas (oxygen or other gas), or fluid cables (not shown). Additionally, remaining elements of robot 1000 that will be described below also have generally centralized passages therethrough to allow for the passage of cables, conduits, or other material as described immediately above.

Figure 22:
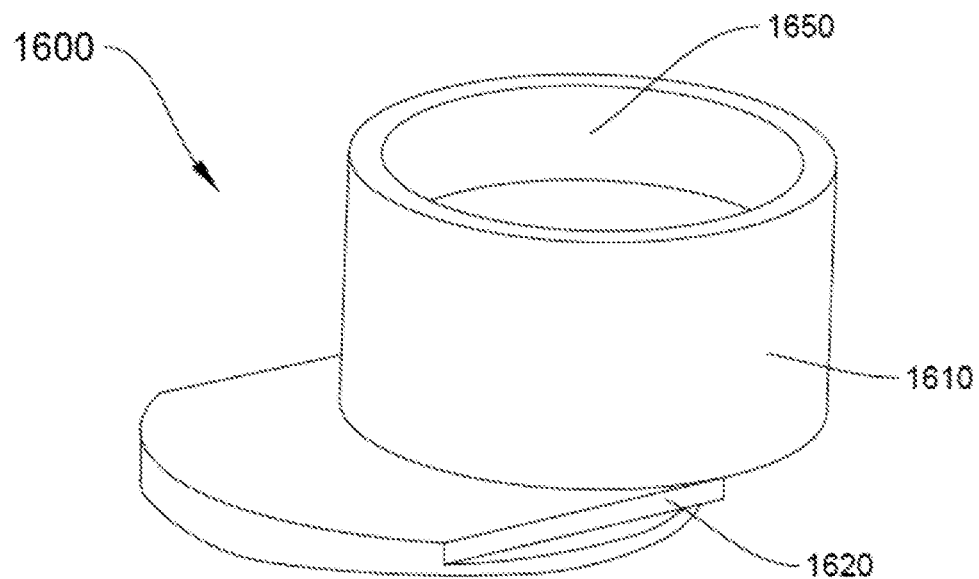
FIG. 22 shows a perspective view of an eccentric input mechanism.
Figure 23:
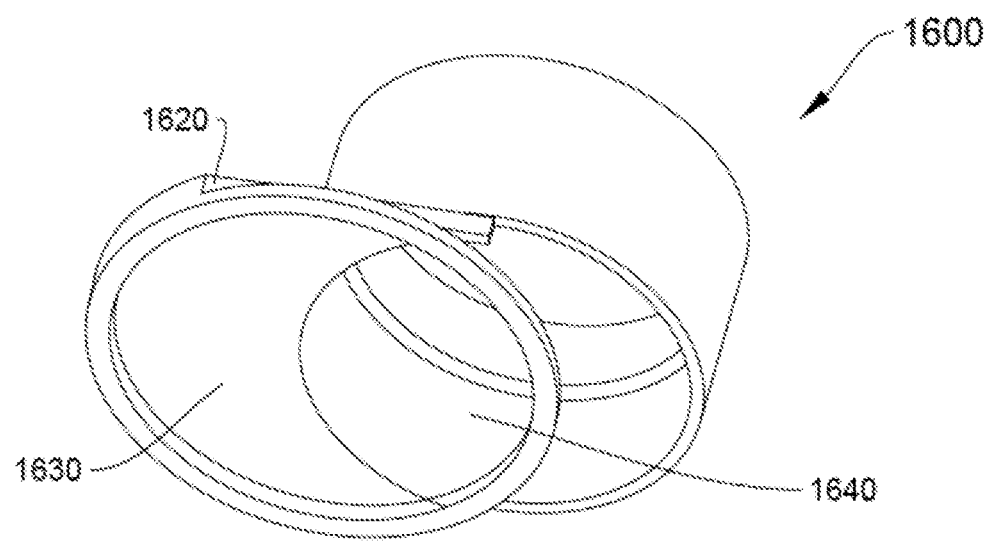
FIG. 23 shows an upward view of the eccentric input mechanism shown in FIG. 22.

FIGS. 22 and 23 show eccentric input disk 1600. Input disk 1600 includes a tubular receiver 1650 that is concentrically located within a housing 1610. Receiver 1650 is sized to allow eccentric sphere 1720 to be inserted into and to rotate concentrically therein. A cycloid rotor output 1630 is eccentrically mounted to housing 1610. A hollow cavity 1640 is provided within rotor output 1630 such that hollow cavity 1640 provides communication to receiver 1650, as shown in FIG. 23. Rotor output 1630 includes a linear edge portion 1620 that is sized to travel within key slot 1820 (shown in FIG. 32) preventing rotation of eccentric input disk 1600 yet allowing for planar translation thereof. In arrangements where axes intersect directly, spherical receiver 1650 may be concentric with rotor output 1630. Further, while linear edge portion 1620 is shown in FIG. 22 as being located at the bottom of housing 1610, those skilled in the art will recognize that linear edge portion 1620 can be located anywhere along the length (height) of housing 1620. For example, in the embodiment of robot 1000 shown in FIG. 20, linear edge portion 1620 can be co-planar with the plane of disk 1800 such that linear edge portion 1620 is able to oscillate within key slot 1820.

Figure 24:
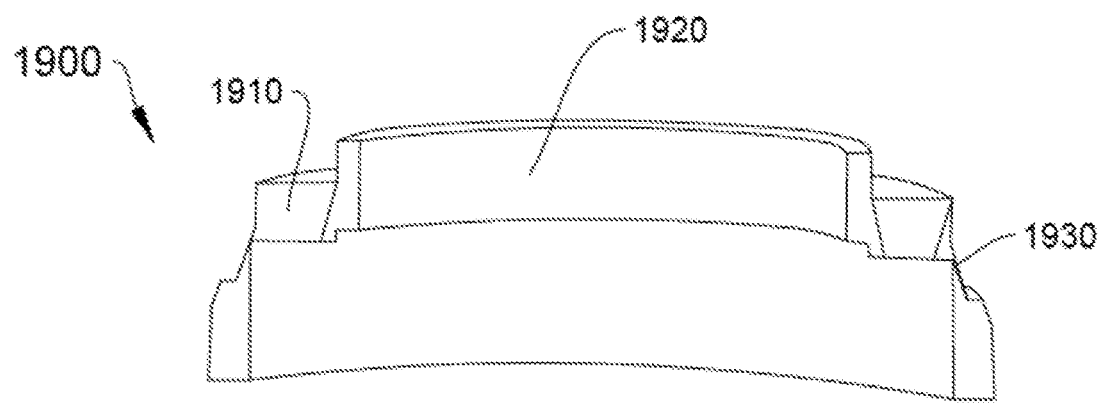
FIG. 24 shows a cross sectional view of a cycloid rotor with lifters.
Figure 25:
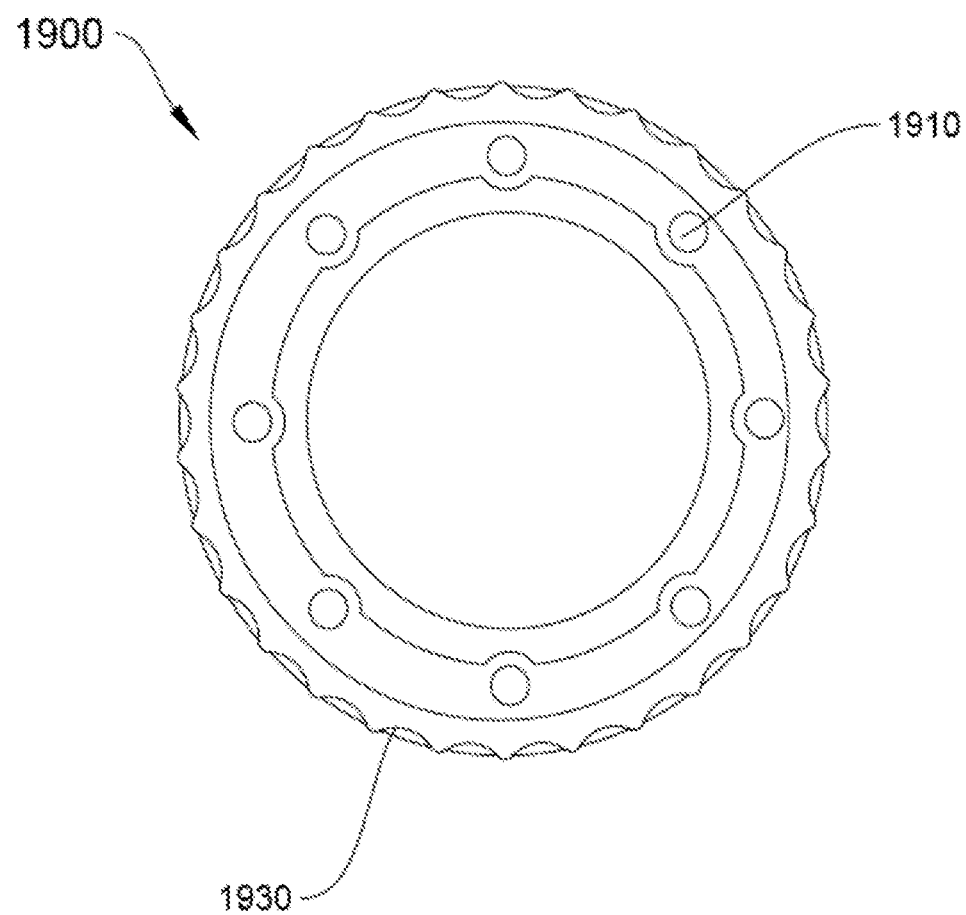
FIG. 25 shows a bottom view of the cycloid rotor shown in FIG. 24.

FIGS. 24 and 25 illustrate the cycloid rotor 1900. Cycloid rotor 1900 includes an eccentric input receiver 1920 that remains concentric with rotor output 1630. Output pin holes 1910 allow for transmission of power to pins 1560. In the exemplary embodiment shown where the inventive drive is also capable of self-locking and unlocking, the walls of holes 1910 are tapered such that tangential loading results in an upward force on pins 1560. For more general uses, holes 1910 may remain cylindrical. Those having skill in the art will recognize that while a tapered wall modification has been shown, other methods exist to accomplish the same motion. Cycloidal profile 1930 is machined into the periphery of the cycloid rotor 1900 such that cycloidal profile 1930 may interface with housing profile 1220.

Figure 26:
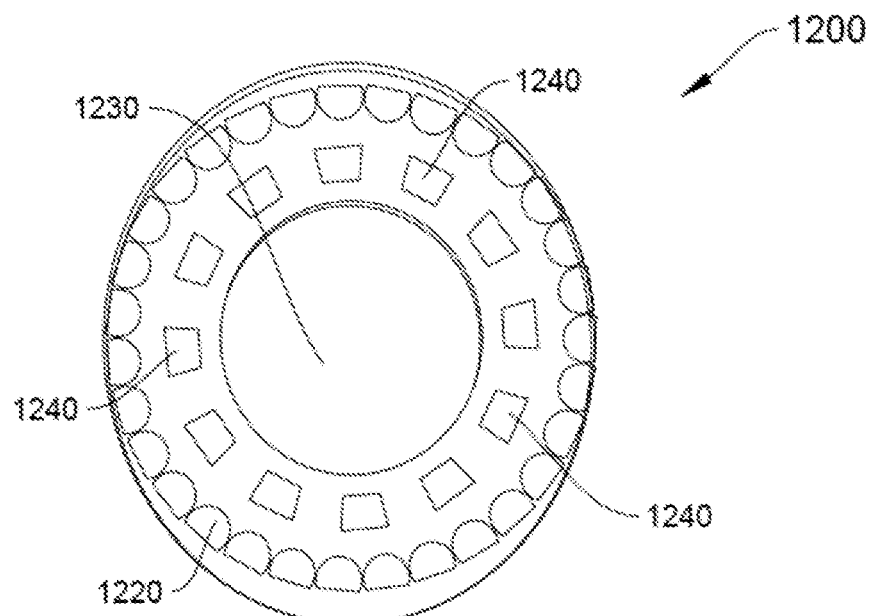
FIG. 26 shows a top view of a distal base plate with curvic and cycloidal teeth.
Figure 27:
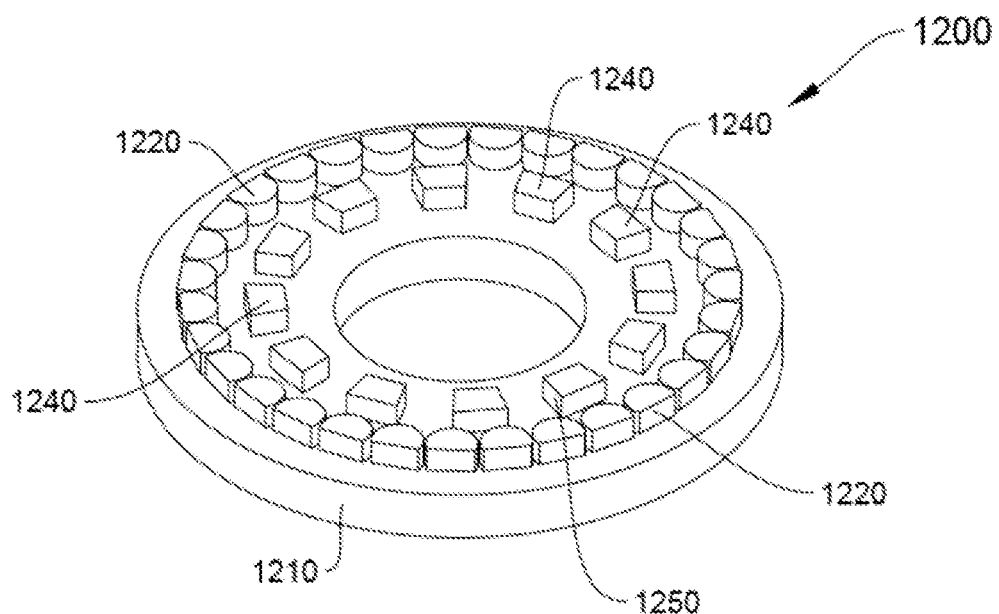
FIG. 27 shows a perspective view of the base plate from FIG. 26.

FIGS. 26 and 27 show the distal face 1200. A groove 1210 is cut at an angle such that groove 1210 interlocks with body 1100, thereby preventing relative rotation between body 1100 and distal face 1200. Cycloid housing teeth 1220, spaced about an outer periphery of distal face 1200, are cut into face 1200 to interact with rotor 1900, as shown in FIG. 20. Curvic teeth 1240 extend outwardly from the face concentric to hollow opening 1230. The teeth 1240 have optional chamfered edge modification 1250 to facilitate smoother operation of mechanism. In embodiments and applications aside from those pertaining to actuation of snake robot 100 disclosed in U.S. Provisional Patent Application 62/237,987, cycloid housing 1220 may be made a part without face and additional curvic teeth.

Figure 28:
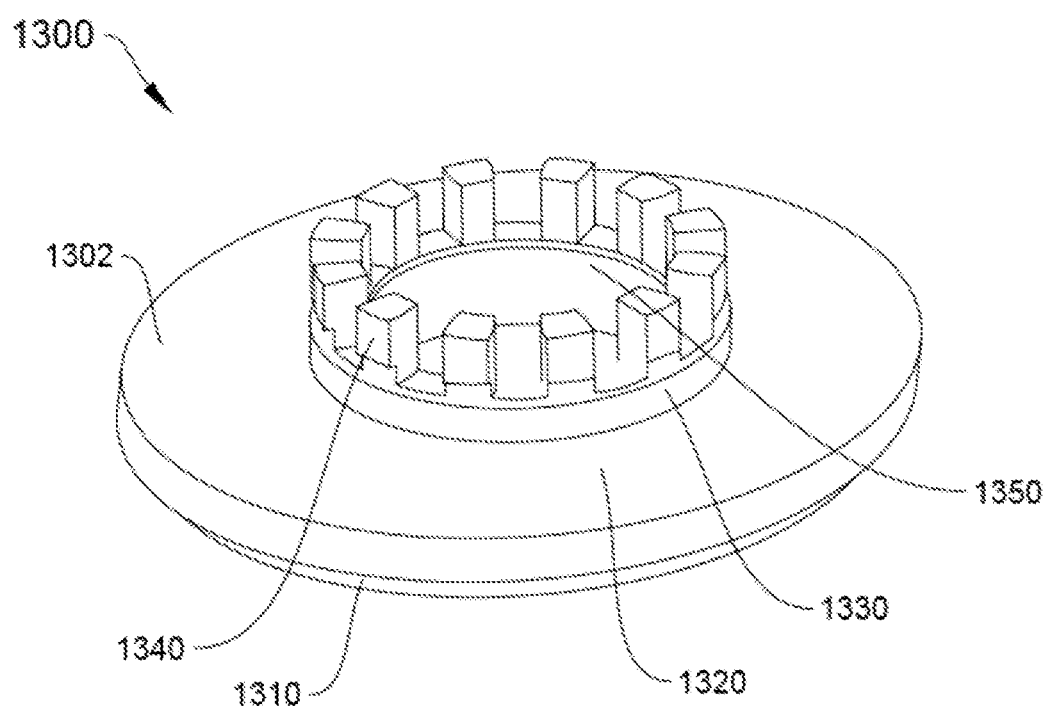
FIG. 28 is a perspective view of a proximal top plate with pin containing curvic teeth.
Figure 29:
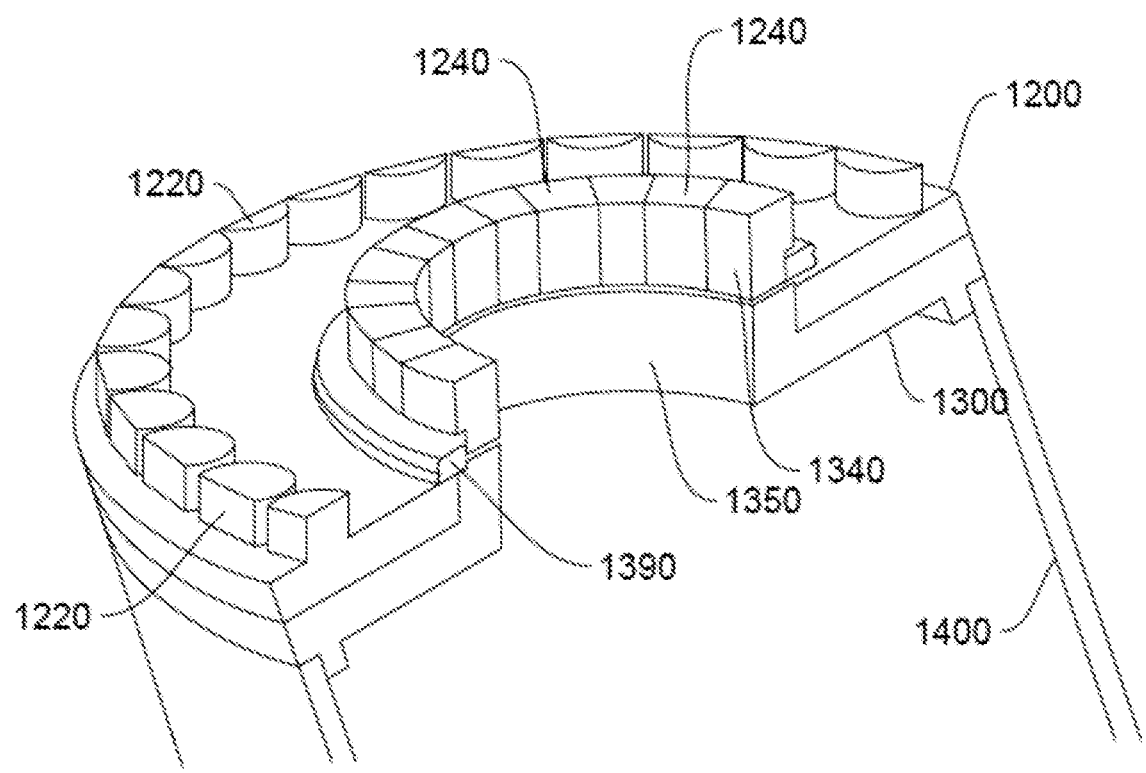
FIG. 29 is a perspective view of the proximal top plate shown in FIG. 28 and the distal base plate shown FIG. 26, secured to each other with a retaining ring.

FIG. 28 shows proximal face 1300 with pin 1320 and curvic teeth 1340. A groove 1310 is machined into periphery to engage with link 1400 and prevent relative rotation. Pin 1320 protrudes from face 1302 and remains concentric with hollow opening 1230 on distal face 1200. Groove 1330 and corresponding curvic tooth modification allow for a retaining ring 1390, shown in FIG. 29, to be inserted to prevent distal face 1200 and proximal face 1300 from separating from each other. Curvic teeth 1340 are cut into pin 1320. Cavity 1350 is machined in center of pin 1320.

Figure 30:
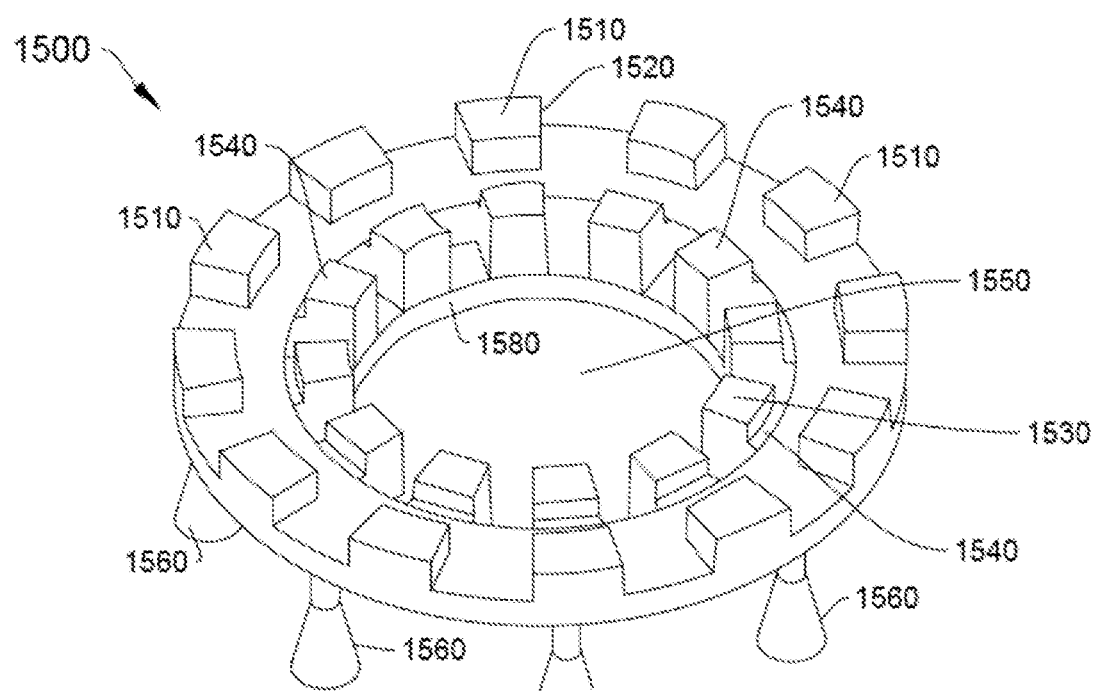
FIG. 30 is a bottom perspective view of an output disk with two curvic teeth sets and pins for lifting mechanism.
Figure 31:
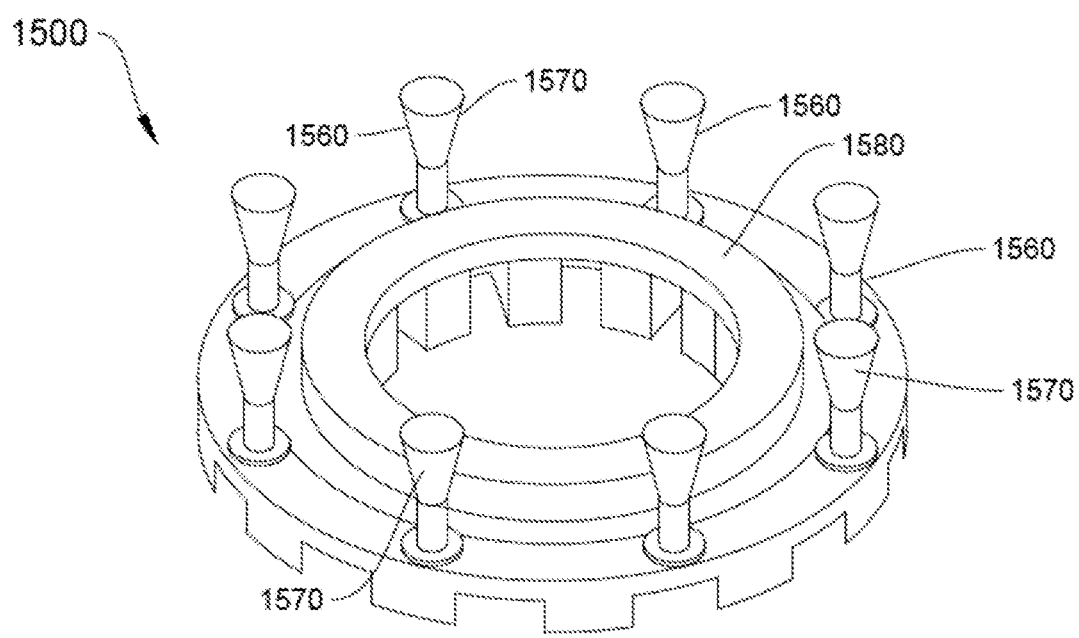
FIG. 31 is a top perspective view of output disk in FIG. 30.

FIGS. 30 and 31 show output disk 1500 with curvic lockout teeth. In this embodiment which allows for the gear train to also self-lock and unlock motion, inner teeth 1540 and outer teeth 1510, both sets of which are curvic in this exemplary embodiment, are added on an opposing side of disk 1500 from pins 1560. An alternative embodiment without the need for unlocking pins 1560 may remain cylindrical in profile. In this embodiment with unlocking features, conical tips 1570 have been applied to the free end of each unlocking pin 1560 to interact with corresponding modification 1910 on cycloid rotor 1900. Those trained in the art will again recognize that other modifications are possible so long as such modifications are consistent between rotor 1900 and output disk 1500. Curvic teeth 1510 interface with teeth 1240 on distal face while teeth 1540 interface with teeth 1340 on face 1300. Teeth 1540 are longer than teeth 1510 such that teeth 1540 may remain engaged while teeth 1510 are disengaged. Chamfered edge modifications 1520 may be applied to improve operation of locking and unlocking of teeth 1510. A groove 1530 may be machined into teeth 1540 to allow for a retaining ring (not shown) to be installed.

FIG. 31 shows a reverse surface of disk 1500 relative to FIG. 8. Disk 1500 includes an annular ring 1580 extending outwardly therefrom on which teeth 1540 are mounted.

Figure 32:
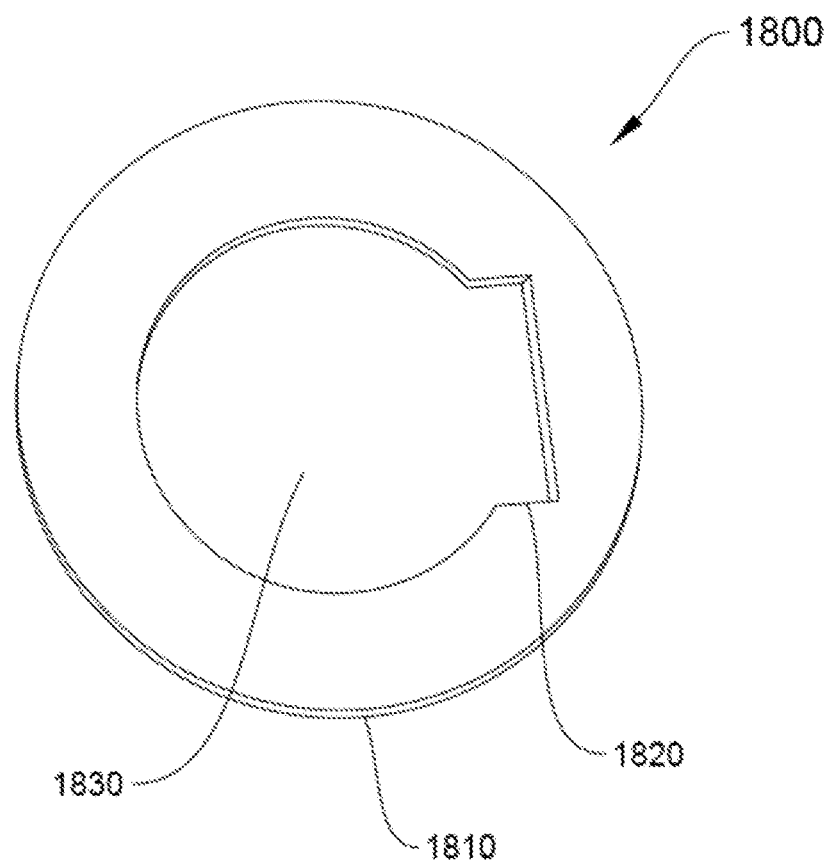
FIG. 32 is a perspective view of a rotation lockout key connected to cycloid rotor in FIG. 22.

FIG. 32 shows a keyed ring that is installed for cases of eccentric, non-intersecting shafts, as shown in the exemplary embodiment. Outer ring 1810 fits concentrically within body 1100, as preventing rotation of outer ring 1810. With respect to body 1100. Likewise keyway 1820 in opening 1830 prevents rotation of eccentric input disk 1600 while still permitting planar translation thereof.

Motion of distal link body 1100 relative to proximal link 1400 is explained as follows. At rest, all curvic teeth are engaged and relative motion between links is prevented, even under the influence of external loads.

To begin motion (in either direction) input disk 1700 with eccentric sphere 1720 begins rotating about its longitudinal axis 1704 concentric to distal link body 1100. The eccentric rotation of sphere 1720 in the horizontal plane of the eccentric input disk 1600 within the sphere receiver 1650 works as a cam causing eccentric input disk 1600 to translate in the horizontal plane.

Key 1620 travels within keyway 1820, thereby preventing any rotation of input disk 1600 with respect to disk 1800.

The input profile 1920 of cycloid rotor 1900 is concentric with output 1630. This in turn forces rotor profile 1930 to move in eccentric motion relative to cycloid housing profile 1220. In the case of a simple gear train without self-locking this motion would result in the rotation of output disk 1500.

In this exemplary embodiment with self-locking, due to the both sets of curvic teeth 1510 being initially engaged with teeth 1240 on distal face 1200 and curvic teeth 1540 on output disk 1500 being initially engaged with teeth 1340 on face 1300, neither distal housing and face 1100 and 1200 nor output disk 1500 are able to rotation. Therefore the eccentric motion of the cycloid rotor 1900, which causes rotor 1900 to rotate, forces conical modification 1910 against the conical modification 1570 of the pins 1560 on the output disk 1500. This force causes the whole output disk 1500 to translate upward while remaining concentric to the pin 1320. Not shown is a spring between the output disk 1500 and cycloid rotor 1900 which resists this motion and stores energy needed to return output disk 1500 to the locked position. The spring can be a wave spring, a helical spring, or other suitable type of spring.

After a prescribed angular displacement of cycloid rotor 1900 has occurred, output disk 1500 has translated upward far enough to disengage the tooth pair of curvic teeth 1510 and teeth 1240 while teeth 1340 and teeth 1540 remain engaged. This prevents relative rotation between the output disk 1500 and pin while allowing body and face 1100 and 1200 to rotation relative to body and face 1300 and link 1400.

Upon unlocking subsequent motion and rotation of the cycloid rotor 1900 results in the rotation of face 1200 and link 1100 about pin 1320 and face 1300. Teeth 1510 ride along 1240 under the pressure of the spring.

Once enough rotation of face 1200 relative to face 1300 has occurred, the teeth 1510 and 1240, having been advanced by one, will line up again. At this point, the spring will force output disk 1500 to translate back down, thereby re-engaging teeth 1510 and 1240 re-locking out rotational motion.

This process may be repeated in either direction until the desired rotation of link 1100 relative to link 1400 has occurred.

Situations may arise where the shaft is longer than the robot and/or the length required to be drilled. In such instances, it is beneficial to be able to secure the drive motor to the shaft at a desired location along the shaft such that the length of the shaft between the drive motor and the drill head is torqued and the length of extra shaft is not torqued.

To accomplish this, the shaft can extend through the drive motor, such as centrally through the motor output. The drive motor can be releasably fixed to the shaft, such as by a collet or other known securing device. The untorqued portion of the shaft can be rolled onto a rotating spool to prevent the shaft from lashing about as the drive motor rotates the shaft.

Figure 33:
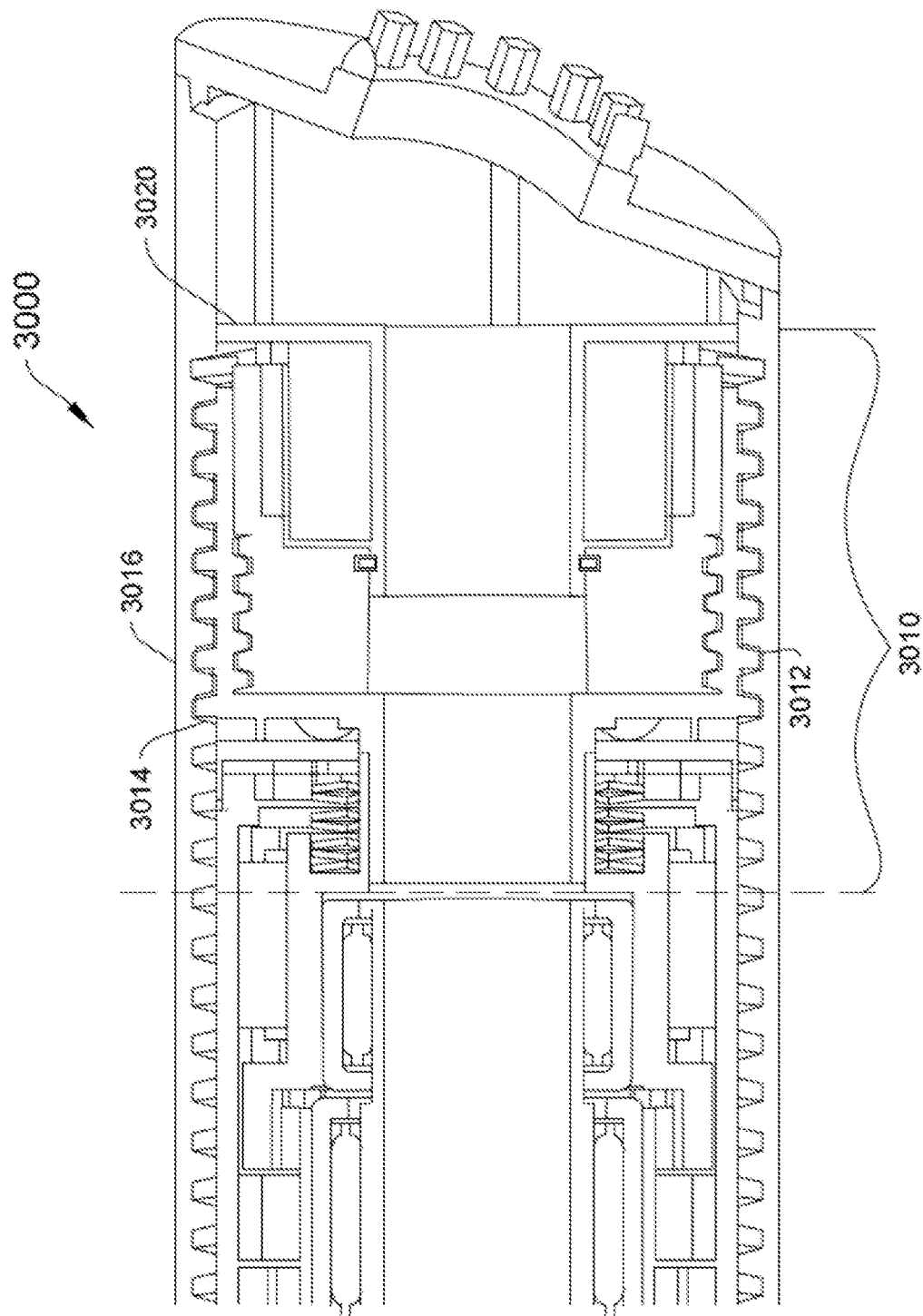
FIG. 33 is a side elevational view, in section, of an end of a link of a robot according to an exemplary embodiment of the present invention.

An alternative embodiment of a cycloid drive assembly for a link 3000 is shown in FIGS. 33-45 Link 3000 includes a drive assembly 3010 for a link elongation mechanism that allows link 3000 to elongate or contract. Drive assembly 3010 includes a threaded outer sleeve 3012 that threadingly engage with inner threads 3014 on an outer sleeve 3016 (shown in FIG. 33).

Referring to FIGS. 33-37, drive assembly 3010 has an endcap 3018 with a generally planar face 3020 having a central through-opening 3021 and plurality of tangs 3022 that are sized and spaced to fit into longitudinal slots formed inside outer sleeve 3016 so that endcap 3018 remains rotationally fixed relative to outer sleeve 3012.

Endcap 3018 also includes a generally cylindrical bushing 3024 extending away from face 3020. Bushing 3024 serves as a seat for a motor stator 3026 that can be frictionally engaged with bushing 3024 to restrict rotation of stator 3026 of a motor 3027 with respect to bushing 3024. Bushing 3024 includes a external circumferential groove 3028 formed distally from face 3020. Groove 3026 seats a clip 3030 that engages a mating groove 3032 in a ball adjuster 3034.

Motor 3027 includes a rotor 3036 that is in frictional engagement with ball adjuster 3034 such that, when rotor 3036 rotates, ball adjuster 3034 rotates with rotor 3036. Ball adjuster 3034 includes a threaded exterior portion 3038 that mates with a threaded interior portion 3041 of outer sleeve 3012 such that, as rotor 3036 rotates, ball adjuster 3034 also rotates. The rotation of ball adjuster 3034 threads ball adjuster 3034 longitudinally relative to outer sleeve 3012 so that ball adjuster 3034 translates axially relative to outer sleeve 3012. As ball adjuster 3034 translates axially, endcap 3018 translates with ball adjuster 3034.

Balls 3040 are disposed in through-openings 3042 in outer sleeve 3012. Balls 3040 are biased toward motor stator 3026 by a biasing member (not shown), such as, for example, a wave spring. Balls 3040 are depressed away from motor stator 3026 by ball adjuster 3034 to bias cycloids (not shown) into a disengaged position to allow for elongation of the robot.

Figure 38:
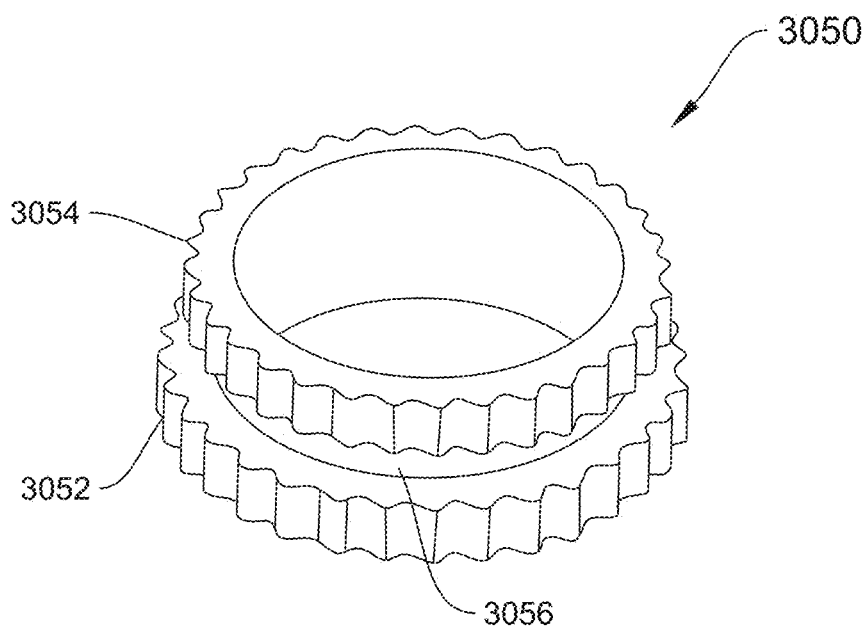
FIG. 38 is a is a perspective view of an alternative embodiment of a cycloid assembly used in the link of FIG. 33.
Figure 39:
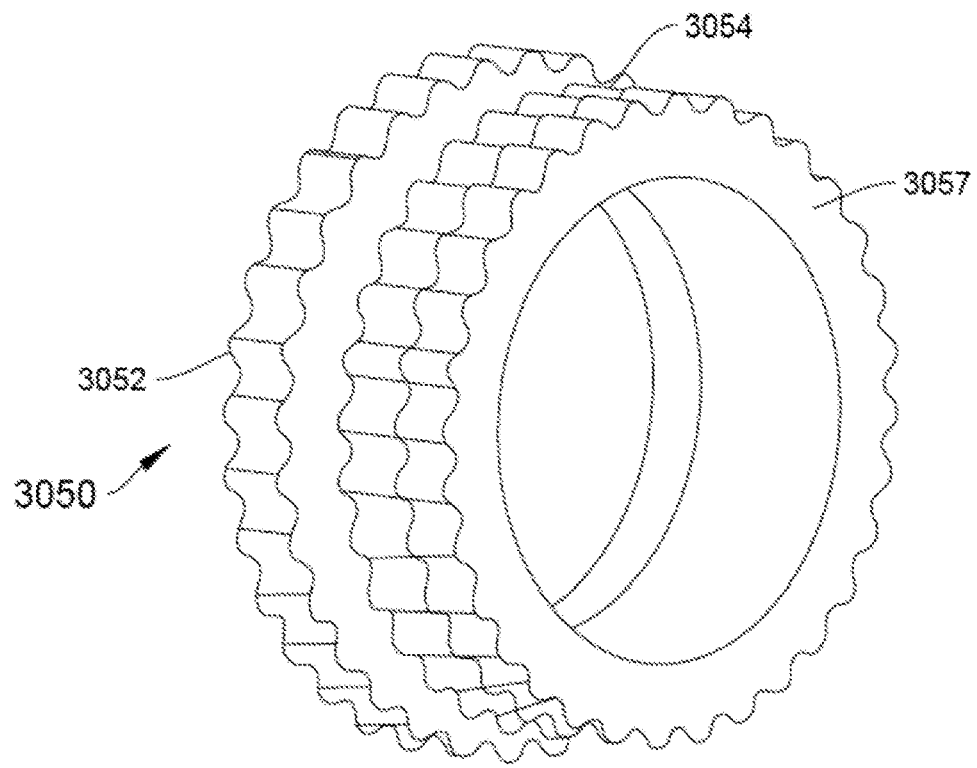
FIG. 39 is a side perspective view of the cycloid assembly of FIG. 38.
Figure 40:
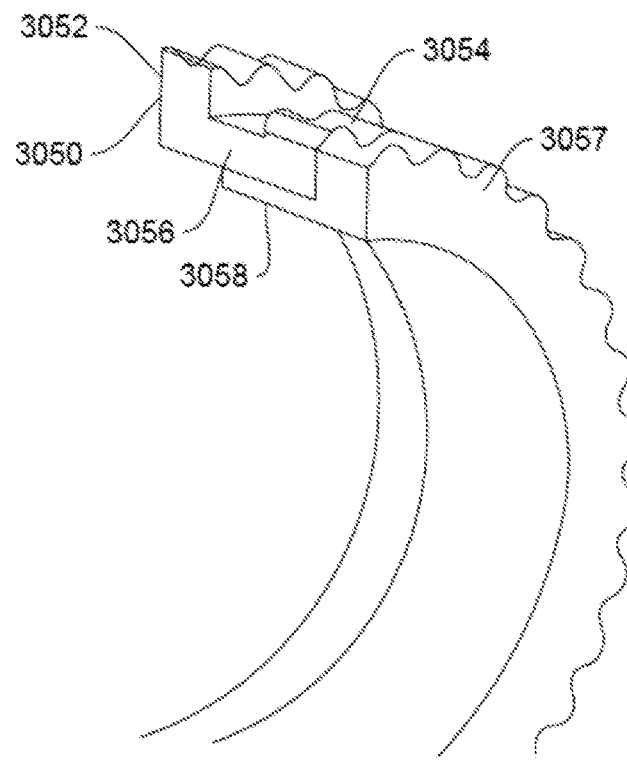
FIG. 40 is a sectional view of the cycloid assembly of FIG. 39.
Figure 41:
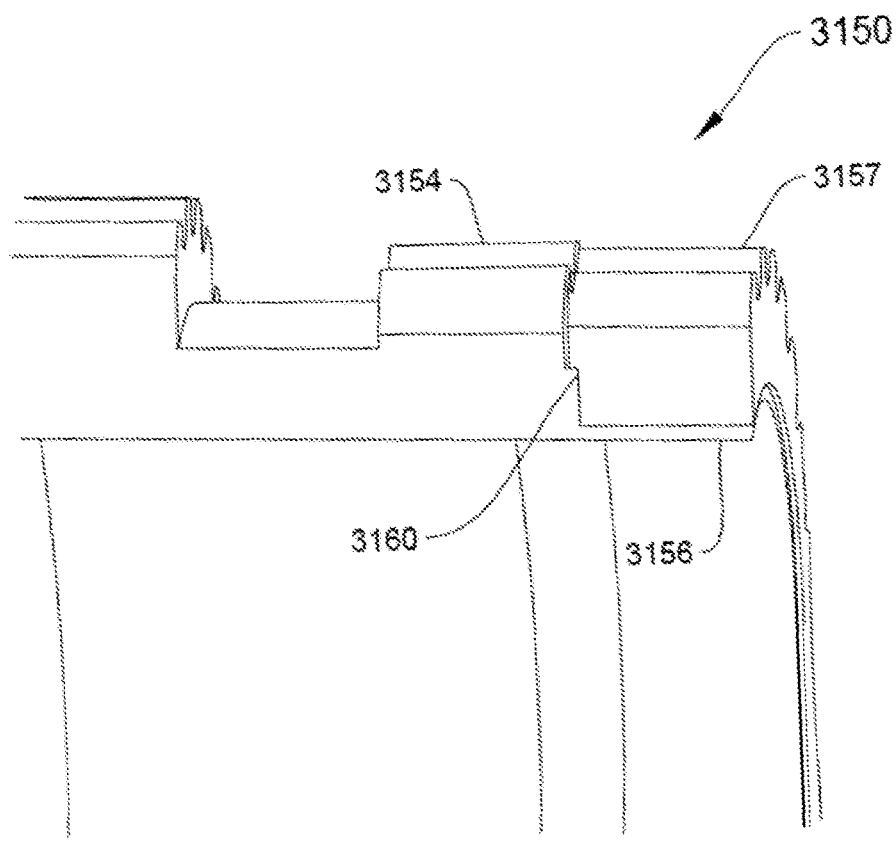
FIG. 41 is an enlarged sectional view of the cycloid assembly of FIG. 40.
Figure 42:
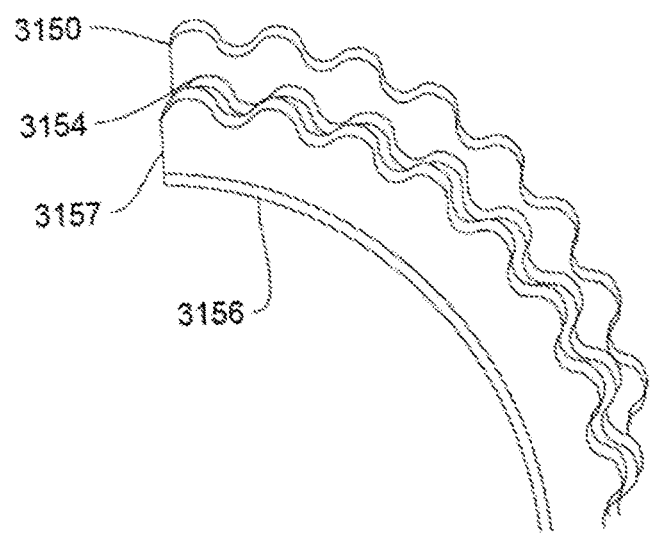
FIG. 42 is a front elevational view of a portion of the cycloid assembly of FIG. 38.

Referring now to FIGS. 38-40, an alternative embodiment of a cycloid assembly 3050 includes a first cycloid 3052 having a first tooth profile is fixedly connected to a second cycloid 3054 by an annular spacer 3056. In an exemplary embodiment, second cycloid 3054 has a smaller outer diameter than first cycloid 3052 so that a thrust bearing 3060 (shown in FIG. 34) can be slid over second cycloid 3054. A third cycloid 3057 has a journal 3058 that extends into cycloid assembly 3050 and frictionally engages cycloid assembly 3050 along second cycloid 3054. Third cycloid 3057 has the same profile as second cycloid 3054 but is offset from second cycloid 3054 by a radial distance to take up any backlash between second cycloid 3054 and its corresponding cycloid (not shown).

Figure 34:
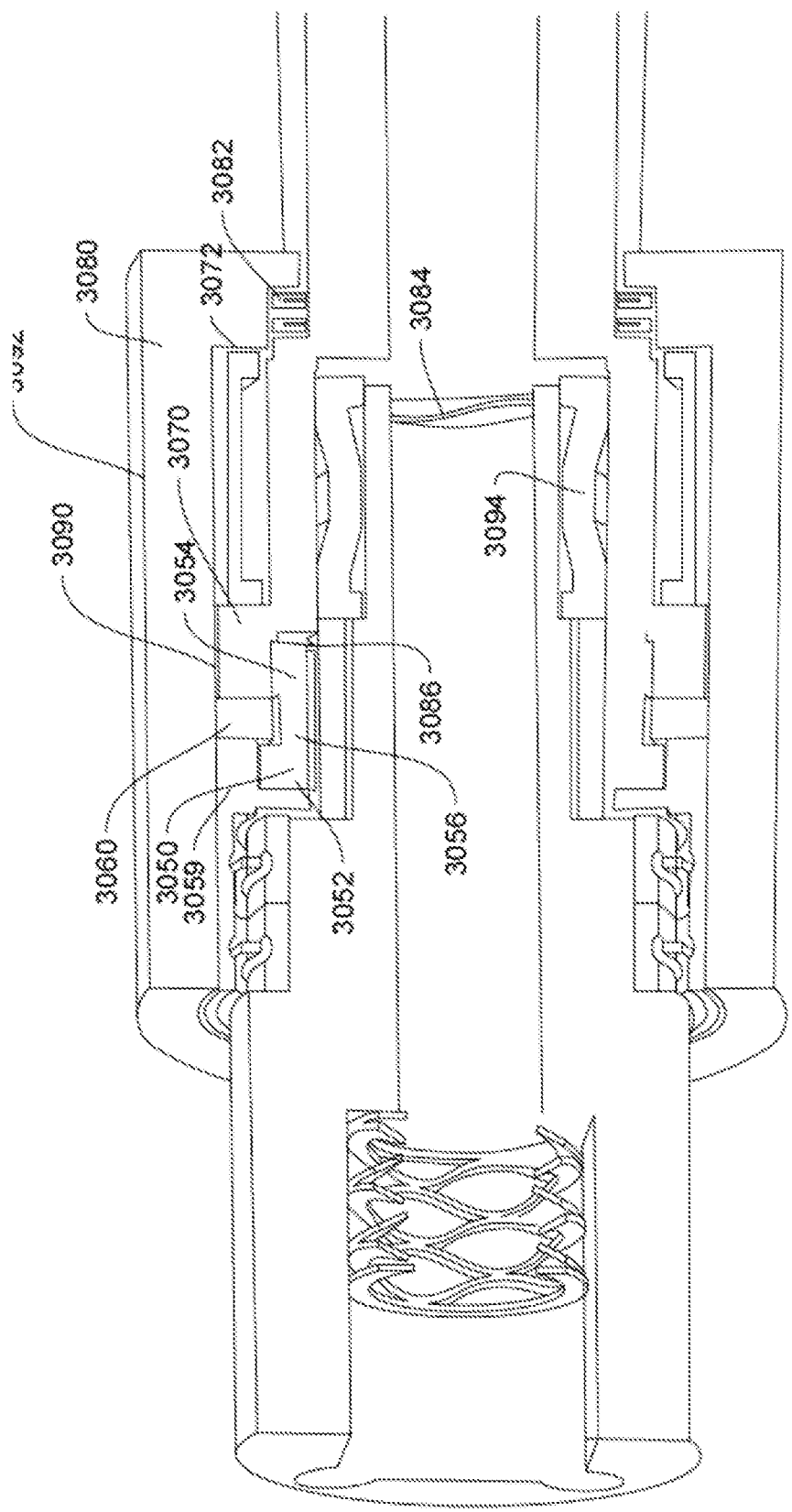
FIG. 34 is a side elevational view, in section of a cycloid assembly used in the link of FIG. 33.
Figure 35:
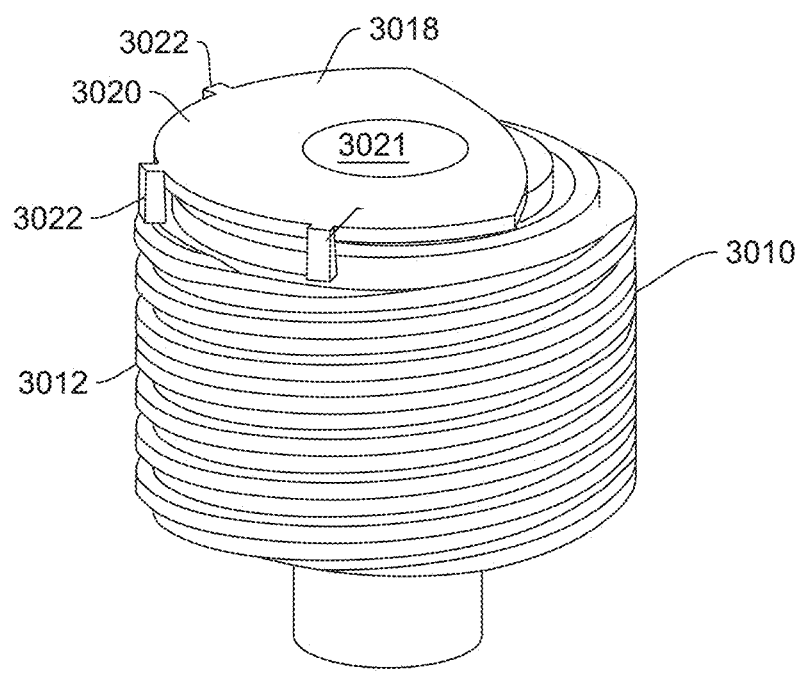
FIG. 35 is a perspective view of a drive assembly used in the link of FIG. 33.
Figure 36:
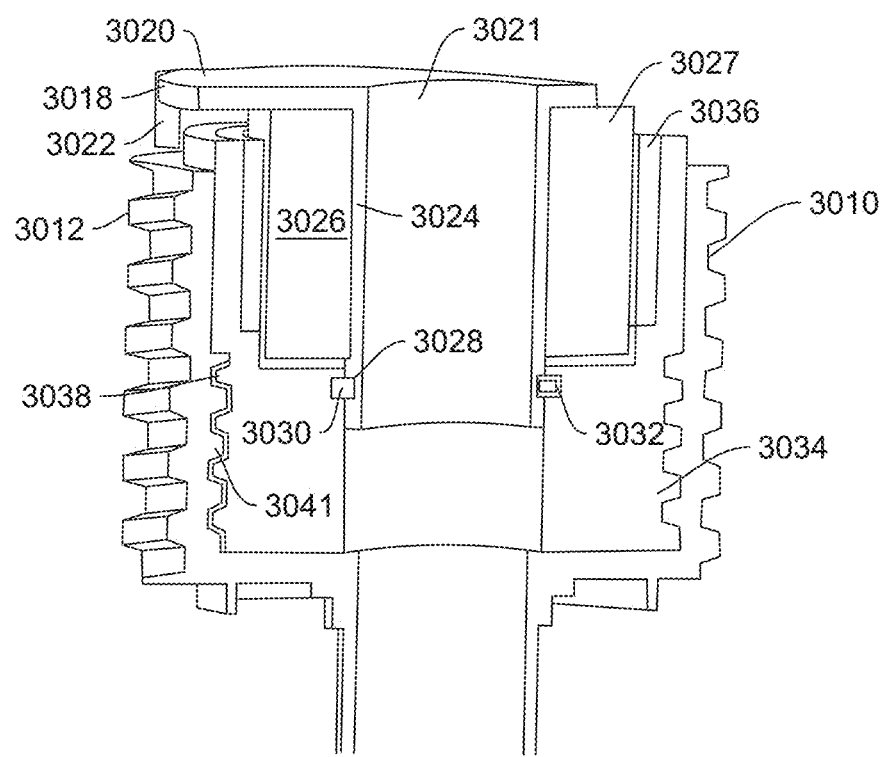
FIG. 36 is a is a sectional view of the drive assembly of FIG. 35.
Figure 37:
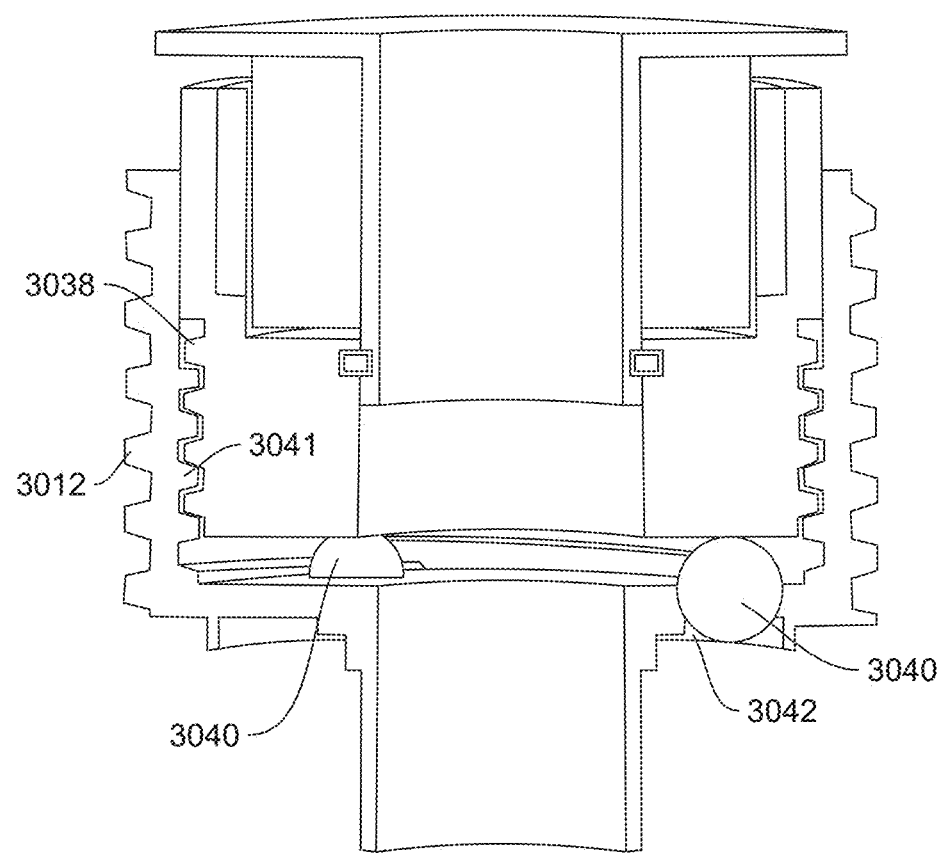
FIG. 37 is a sectional view of a lifter assembly used in the link of FIG. 33.

Also, referring to FIG. 34, thrust bearing 3060 engages a free end 3070 of an output housing 3072 to absorb an axial load of output housing 3072. Further, radial surface 3090 of output housing 3072 engages inner wall of support block 3092 and radial surface 3090 acts as a journal bearing for support block 3092. Thrust bearing 3060 also engages a fixed housing 3059. Biasing member 3082 biases output housing 3072 against thrust bearing 3060 and biasing member 3084 biases bearing 3094 to the left as shown in FIG. 10A and biasing member 3086 biases cycloid assembly 3050 against fixed housing 3059.

Referring to FIGS. 41-45, an alternative embodiment of a cycloid assembly 3150 biases a third cycloid 3157 radially from second cycloid 3154 to decrease backlash. Second cycloid 3154 includes a journal 3156 on which third cycloid 3157 rides so that cycloids 3154 and 3157 are co-axial. Second cycloid 3154 includes a plurality of male ramps 3160 (one ramp 3160 shown in FIG. 41) that face third cycloid 3157, while third cycloid 3157 includes a like plurality of female ramps 3162 facing ramps 3160.

Figure 43:
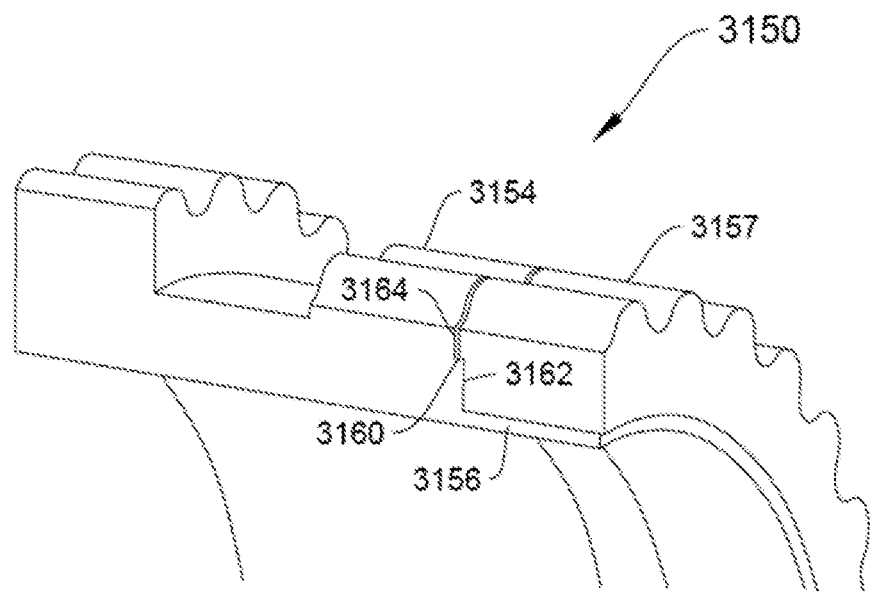
FIG. 43 is a sectional view of the cycloid assembly of FIG. 38, with adjacent teeth in alignment.
Figure 44:
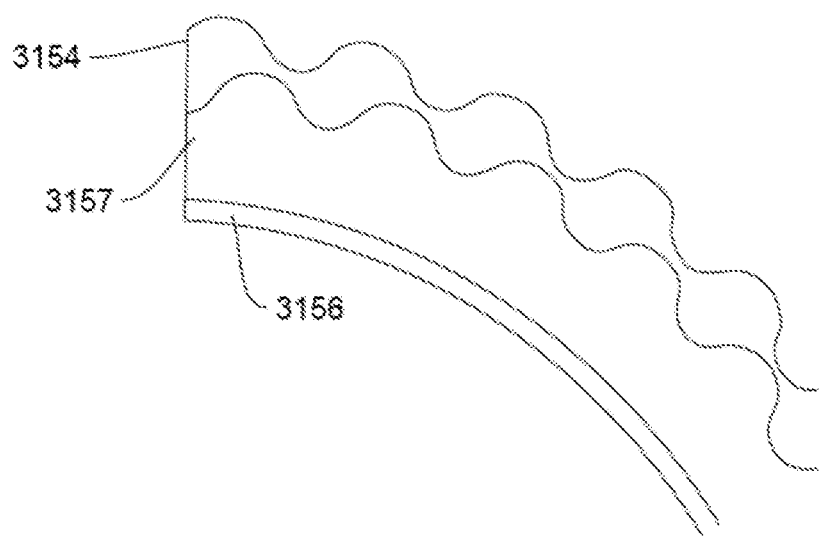
FIG. 44 is a front elevational view of the cycloid assembly of FIG. 43.
Figure 45:
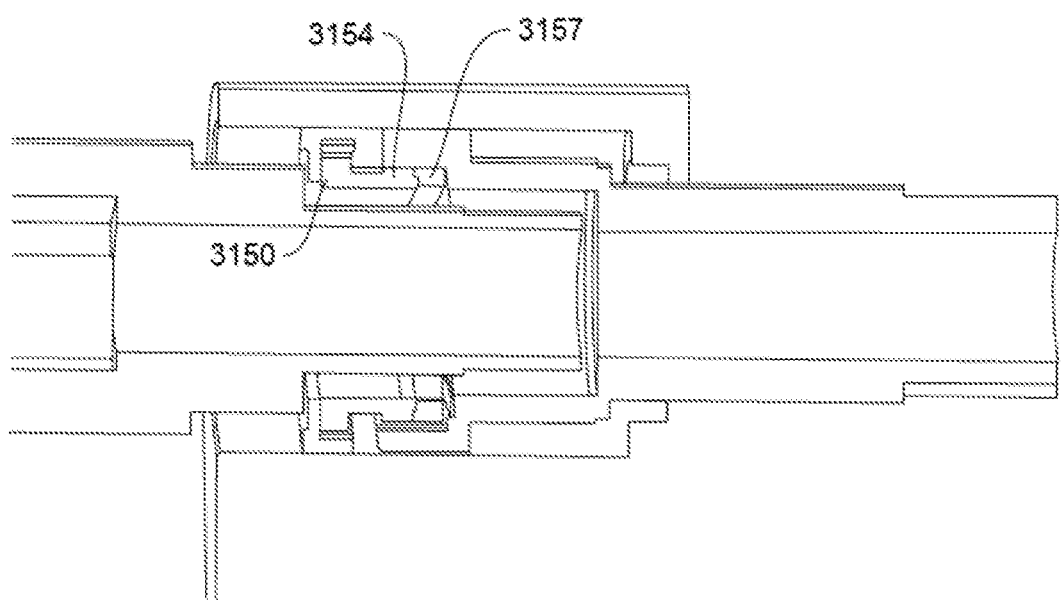
FIG. 45 is a side elevational view of the cycloid assembly of FIG. 43 inserted into the link of FIG. 33
Figure 49:
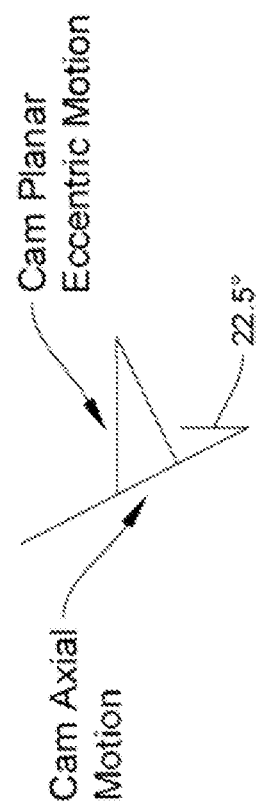
FIG. 49 is a vector drawings of cam motion for the cam shown in the link of FIG. 48.

When the teeth of third cycloid 3157 are aligned with the teeth of second cycloid 3154, as shown in FIGS. 43 and 44, a gap 3164 is provided between the teeth of second cycloid 3154 and third cycloid 3157. When third cycloid 3157 is biased toward second cycloid 3154, such as by a biasing member 3086 (shown in FIG. 34), the ramps 3160, 3162 ride up on each other, closing the gap 3164, but also rotating third cycloid 3157 relative to second cycloid 3154 as shown in FIGS. 43 and 44, so that the teeth of third cycloid 3157 are out of alignment with the teeth of second cycloid 3154, taking up any backlash between the teeth and an engaging gear.

An exemplary actuator used to generate an oscillatory motion referred above with respect to linear edge portion 1620 and key slot 1820 is shown in FIGS. 46-54. Referring to FIG. 46, a member 2502 with two parallel sides 2504, 2506 is attached to a cycloid housing 2508 that rides within a key 2510. The key 2510 also has sides 2512, 2514 that are parallel but rotated 90 degrees to ride within a slot 2518 cut into the face/cycloid housing 2508. This allows the member 2502 to translate, generating a circle, but not rotate relative to the face or body.

An exemplary locking and unlocking mechanism for the inventive robot is now described. The mechanism functions on the pin curvic directly, such as with disk 1500 described above, rather than bevel gears.

Referring to FIG. 47, the tops of the output pins 2520 are shaped to make pins 2520 ramps so that a locked cycloid rotor 2522 would first lift the output pins 2520, unlock the curvic 2524, then rotate the body 2526 by one curvic tooth-2528 before being pushed down by a spring (not shown).

Figure 48:
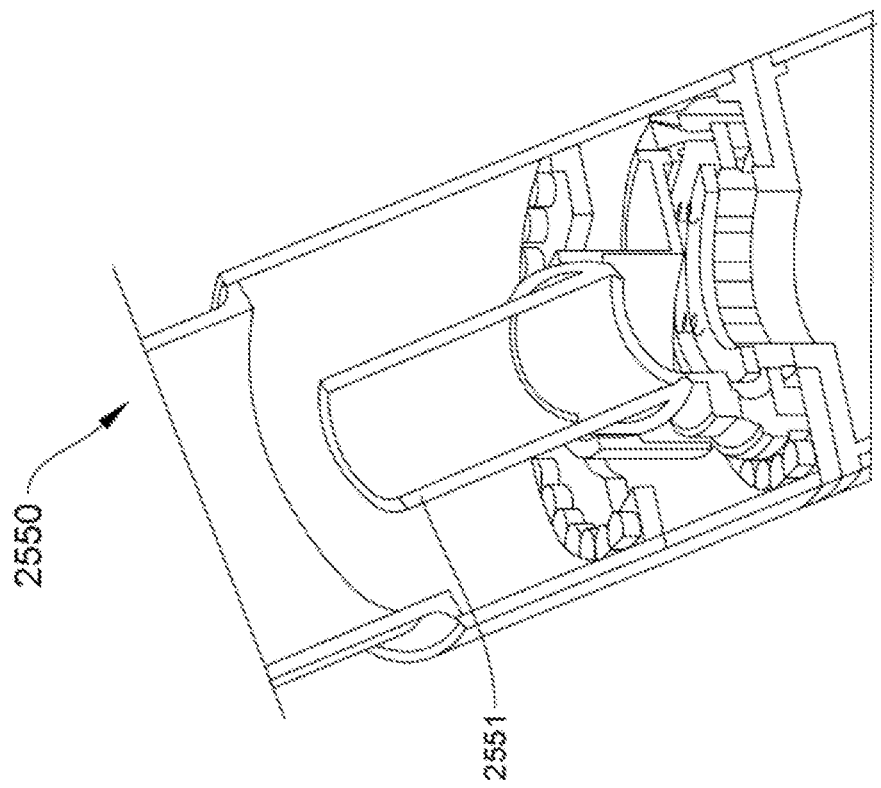
FIG. 48 is a sectional view of an end of the link of FIG. 33 with the cycloid assembly of FIG. 38.

When spun, the input cam 2530 rotates the rotor 2532 against the cycloid housing 2534. Initially the curvic teeth 2526 would be locked out, causing the cycloid output pins 2520 to push against output holes 2536 in the rotor 2532. All of the motor's torque goes into pushing the holes 2536 against the sloped pin heads 2520 causing the pin heads 2520 to pull up, compress the spring, and unlock the curvic teeth 2526. Face 2538 rotates and advances the curvic teeth 2526 by one, at which point the spring re-locks, preventing further motion. An inventive link 2550 that incorporates this actuator is shown in FIG. 48.

Input shaft 2551 moves axially by ~0.006 inches (0.15 mm) per rotation. The pure eccentric motion is normal to the cam axis inducing the axial and planar cam movements shown in FIG. 49.

Figure 50:
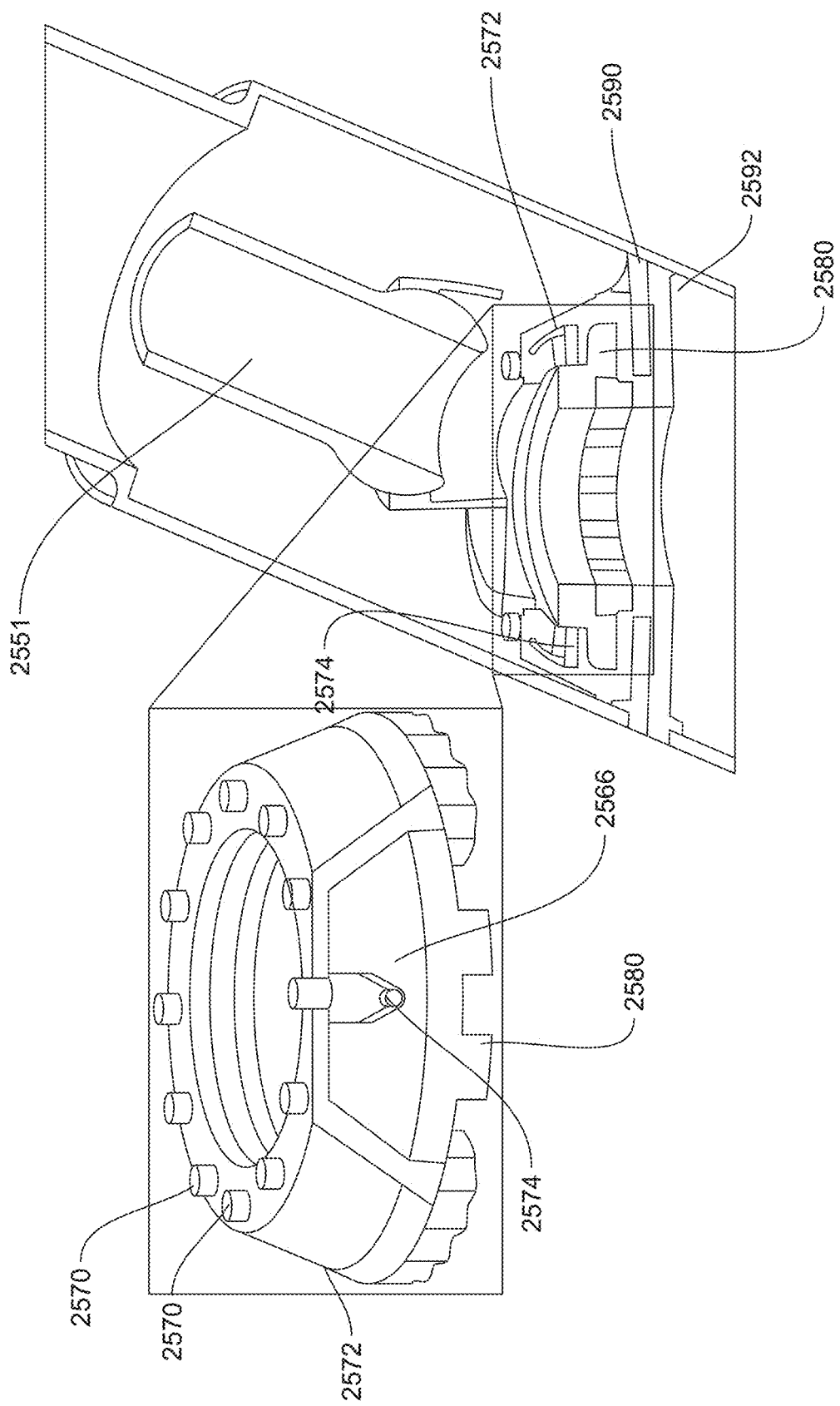
FIG. 50 is a is a sectional view of an end of the link of FIG. 33 with a lifting mechanism incorporated therein.

An alternative concept, shown in FIG. 50, includes cylindrical T-shaped output pins 2570 so that pins 2570 can ride along the top of the rotor 2572. The pin head diameter is sized such that the pin head fits through output holes 2574 in the rotor 2572 when pins 2570 are concentric for assembly, and then ride along the top of pins 2570 during eccentric motion. Lifter pins 2574, shown in FIG. 51, extend radially outwardly from the curvic lockout member 2580 and ride along the unlock ramp 2566 cut into the output pin member. A spring 2576 is used to bias the curvic lockout member 2580 away from ramp 2566. To unlock, the cycloid would begin rotating, which would rotate the ramp 2566 against the lifter pin 2574. This would, in turn, pull up the curvic lockout member 2580 while the ramp 2566 pulls the tops of the T-shaped output pins 2570 against the cycloid rotor 2572.

Figure 52:
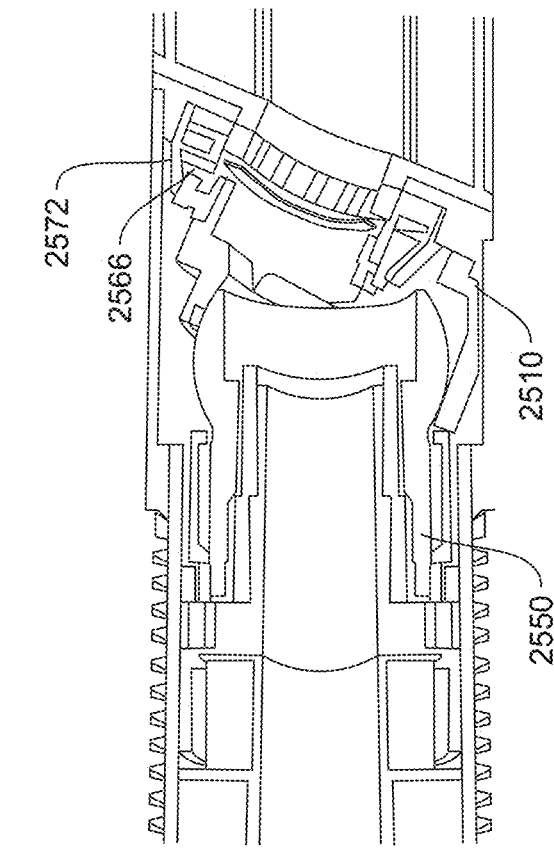
FIG. 52 is a perspective view of a modified ramp with lifter for use in the cycloid assembly of FIG. 48.
Figure 51:
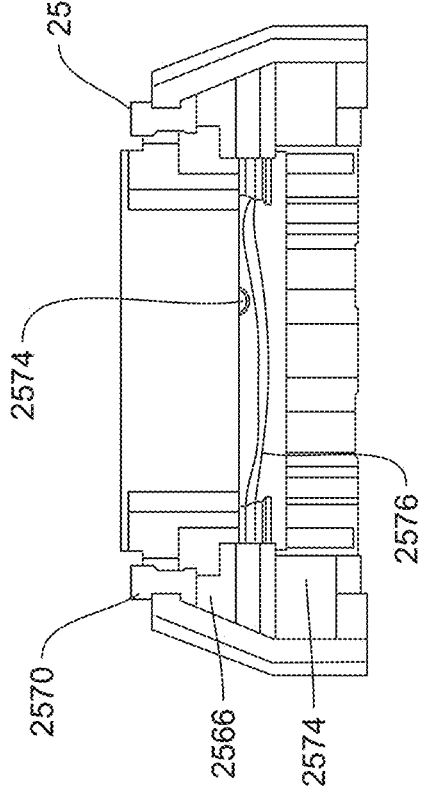
FIG. 51 is a sectional view of the lifting mechanism of FIG. 50.
Figure 53:
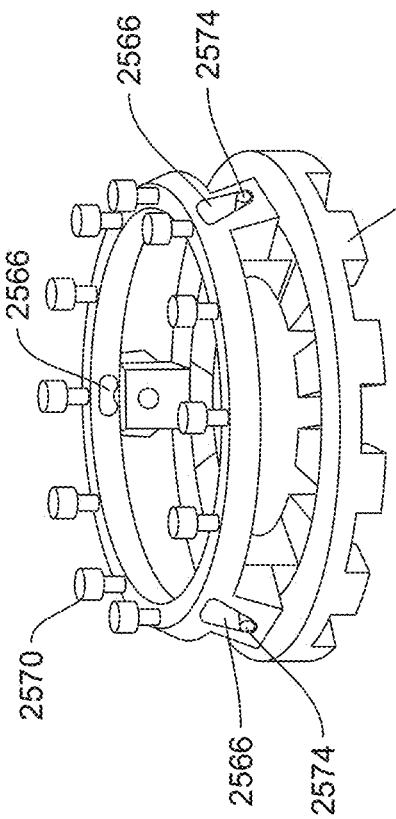
FIG. 53 is a side elevational view, in section, of a cycloidal drive used in a robot according to an exemplary embodiment of the present invention.

Biasing force is provided by Belleville washers, also known as disk springs, which are compression springs commonly used in applications where a constant force profile is needed. The ramp 2566 and lifter 2574 can be slotted along with the outer the periphery of the washer spring, as shown in FIG. 52. Another alternative spring design is ring springs where rigid inner and outer ring elements with ramps cut into their faces expand and contract when loaded functioning as a spring. An exemplary 3D cycloidal drive using the components described above is shown in FIG. 53.

Figure 54:
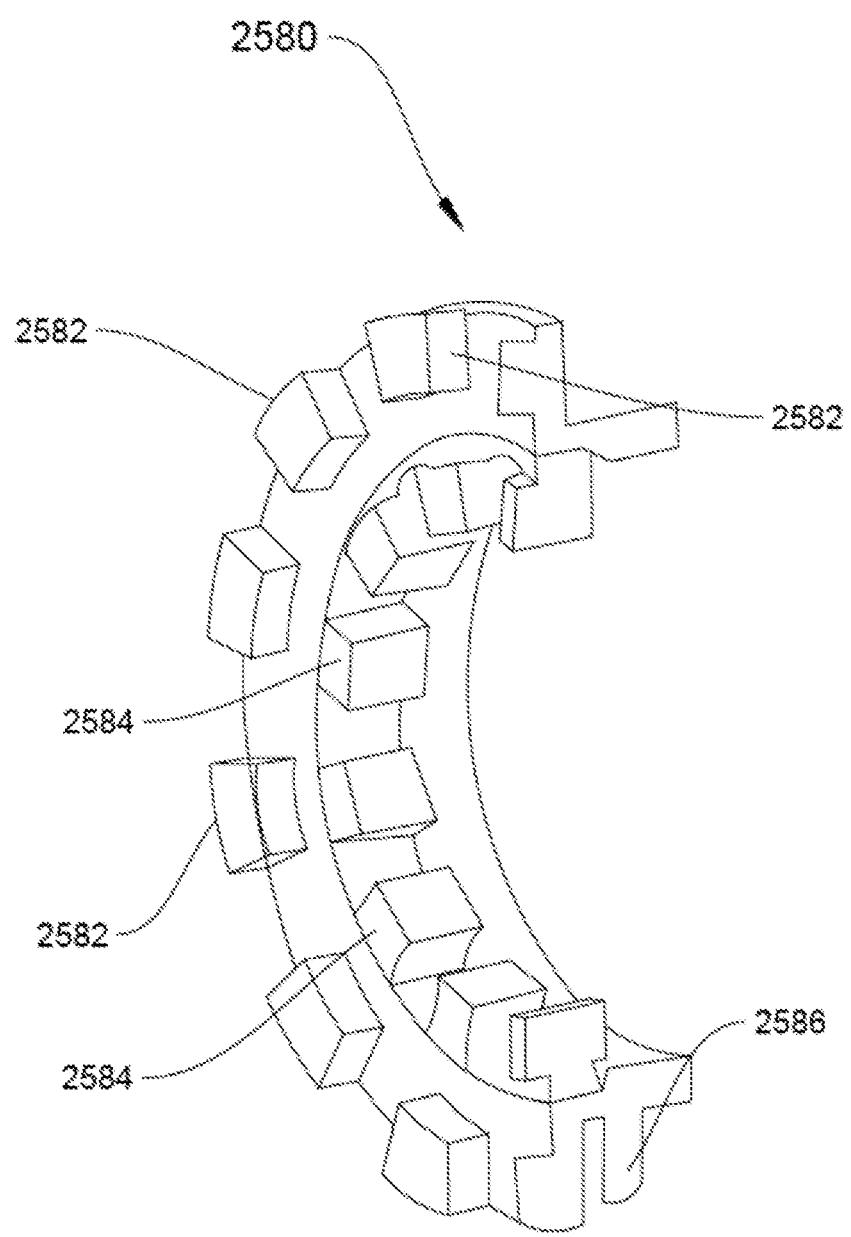
FIG. 54 is a perspective view, in section of a curvic plate used in the cycloid assembly of FIG. 48.

Another detailed component is the curvic lockout member 2580, shown in FIG. 54, which has both 1 mm and 2 mm curvic teeth 2582, 2584, respectively, allowing member 2580 to remain rotationally fixed to pin 2586 while being able to lock/unlock the motion of face 2590 relative to face 2592. As modeled in FIG. 54, the dowel pins 2586 are designed to be inserted, making the component manufacturable. The inner and outer teeth 2584, 2582 are spaced radially such they can be milled and a retaining ring (not shown) can be used to lock the cycloid housing face 2590 and pin 2586 together axially.

The 3D cycloidal drive described herein that self-locks and unlocks developed in this section is a novel contribution to the gear train field. While developed for use in the inventive robot, this gear mechanism has the potential to replace bevel gears in other applications where space is at a premium.

Referring now to FIGS. 55-66, an alternative embodiment of a link actuator of a robot 2000 is shown. Robot 2000 can be mounted in a housing as discussed above. Alternatively, robot 2000 can be fixed in any other type of housing or securing device.

Figure 55:
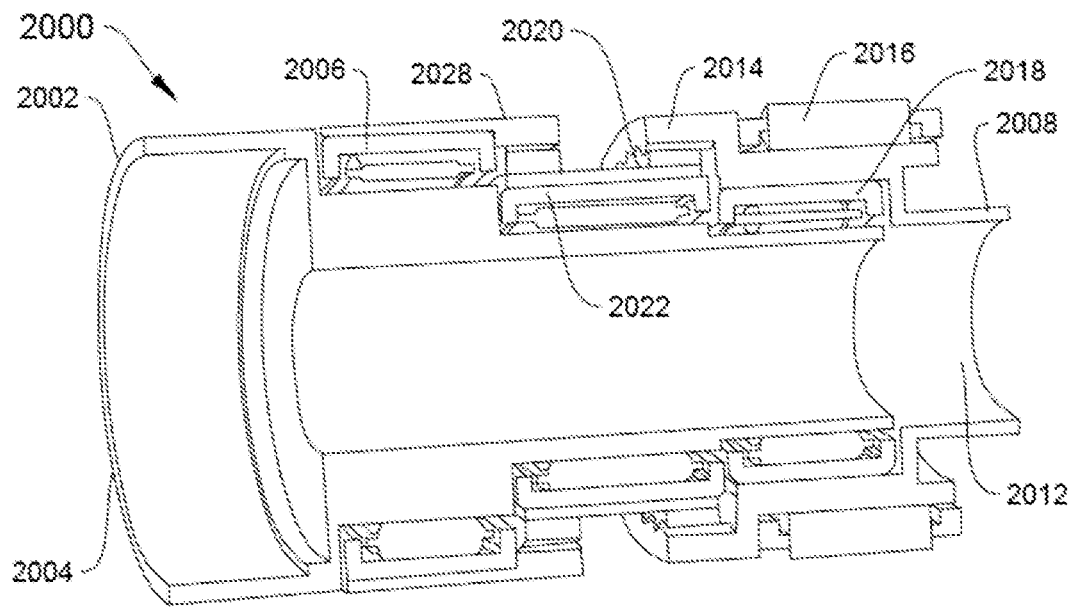
FIG. 55 is perspective view, in section, of a portion of a robot according to an exemplary embodiment of the present invention.
Figure 56:
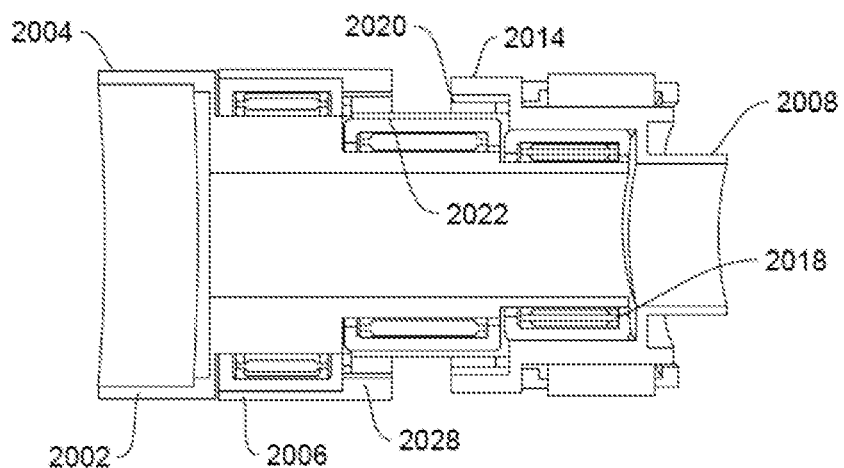
FIG. 56 is a is a side elevational view, in section, of the portion of the robot of FIG. 55.

A motor input 2002 is shown in cross section in FIGS. 55, 56, and 60. Although not shown, a motor can be fit at input end 2004. Motor input 2002 is concentrically mounted in its housing. Section 2005, however, is eccentrically mounted and drives the cycloid, as will be discussed herein. Motor input 2002 is hollow along its longitudinal axis to allow for the passage of a shaft, tubing, or other tooling (not shown) to extend therethrough. A support bearing 2006, shown in FIG. 55, supports motor input 2002 inside its housing.

A motor output 2008, shown in FIG. 59, is driven by motor input 2002. Motor output 2008 includes a cycloid profile 2010 at its input end 2014, distal from output end 2012, which is eccentric. A bearing 2016 (shown in FIG. 55) is disposed between motor output 2008 and the housing. Additionally, a bearing 2018 is disposed between the motor output 2008 and the motor input 2002. Motor output 2008 can be connected to an output device, such as screw 2009, shown in FIG. 59.

A rotor 2020 is shown in detail in FIG. 57. A bearing 2022 (shown in FIG. 55) supports rotor 2020 on eccentric surface 2005. Rotor 2020 includes two profiles 2024, 2026 on one unit. Referring to FIGS. 55 and 58, a cycloid housing 2028, which engages profile 2026, is rotationally fixed.

Figure 61:
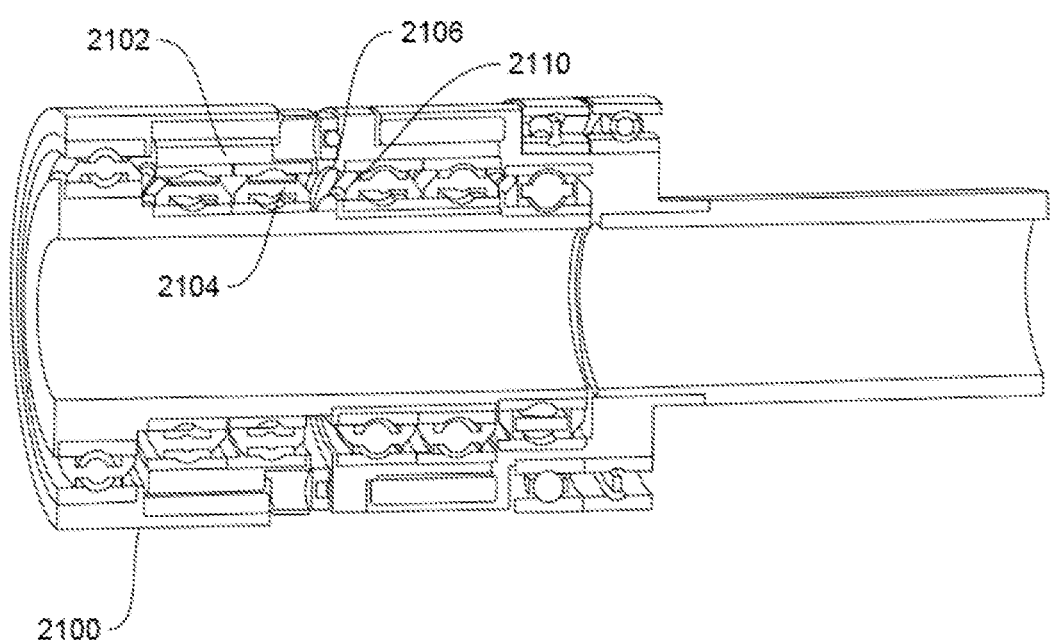
FIG. 61 is a perspective view, in section, of a rotor assembly with bearings used in the robot of FIG. 55.
Figure 62:
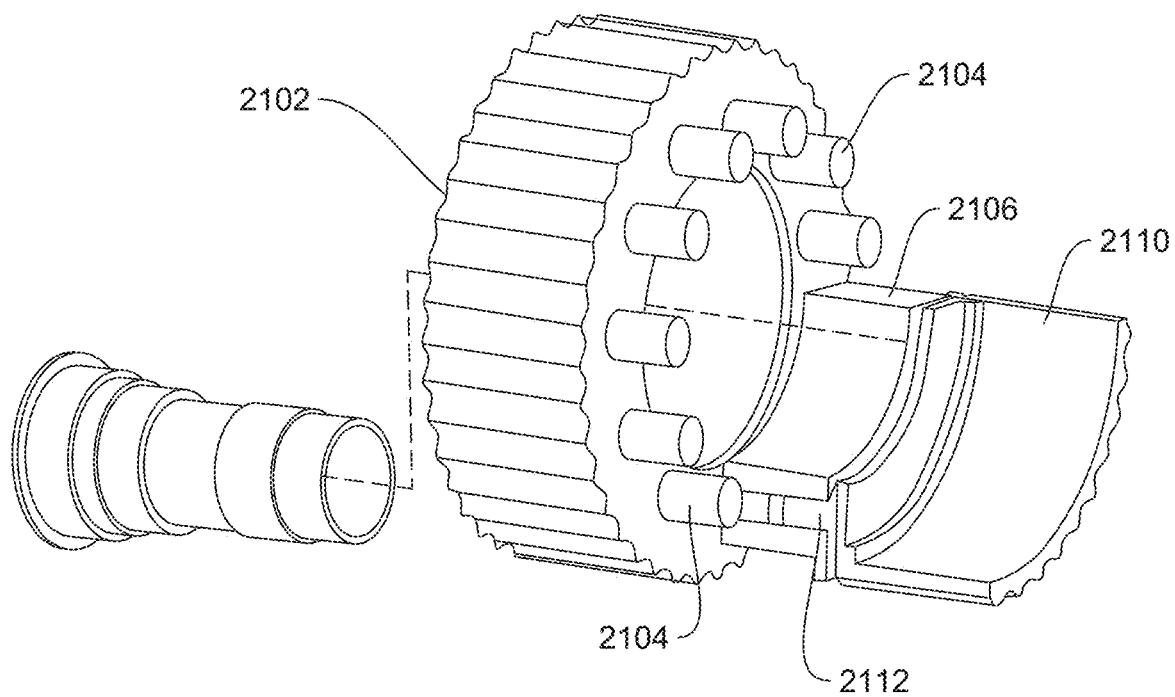
FIG. 62 is a perspective view, in section, of a cycloid rotor assembly used in the robot of FIG. 55.
Figure 63:
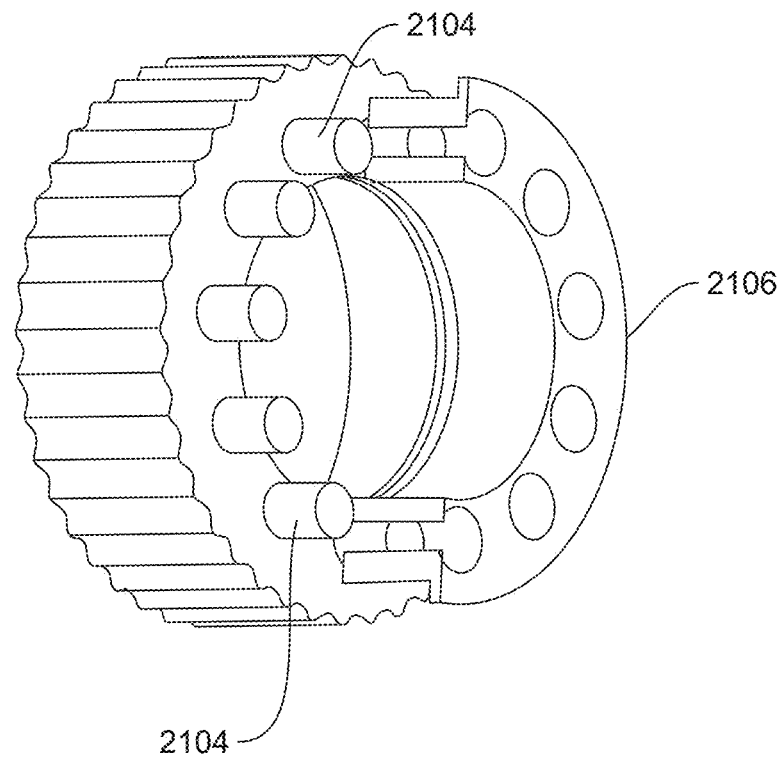
FIG. 63 is a perspective view of the cycloid rotor assembly of FIG. 62, with a cycloid removed.
Figure 70:
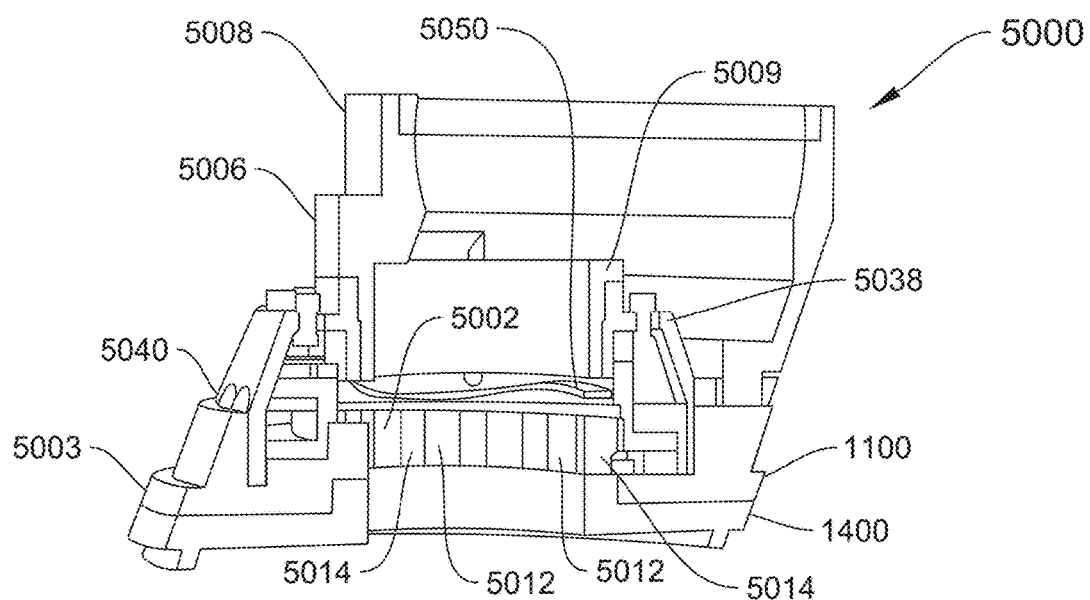
FIG. 70 is an enlarged portion of the actuator of FIG. 67.

Referring now to FIGS. 61-63, an embodiment 2100 includes a cycloid 2102 having pins 2104 that extend into an output 2106. Similarly, a cycloid 2110 has pins 2112 that extend into the element 2106.

Referring now to FIGS. 64-66, an embodiment 1201 includes a rotor 1202 having holes 1204 that accept pins 1206 in a ring 1208, shown in FIG. 6-10. Ring 1208 includes ball 1210, shown in FIG. 66, that acts like a thrust bearing.

An actuator 5000 is shown in FIGS. 67-83. Actuator 5000 is similar to actuator 2550 shown in FIG. 48, with curvic member 2500 in FIG. 52 being substituted for an end face 5002 shown in FIG. 71. Actuator 5000 can be used in a robot described herein, such as robot 100 having a first link 1100 and a second link 1400. Actuator assembly 5000 is configured to rotate the first link 1100 relative to the second link 1400.

Assembly 5000 includes a motor, such as a motor 3027, that is configured to lift end face 5002 of the first link 1100 out of engagement with the second link 1400; rotate the first link 1100 relative to the second link 1400; and lower the end face 5002 of the first link 1100 into engagement with the second link 1400. As shown in FIG. 67, a through passage 5003 is formed between the motor 3027 and the end face 5002. The through passage 5003 allows for the passage of wires, shafts, fluid conduits, or other material through links 1100, 1400.

In an exemplary embodiment, the rotation of first link 100 relative to second link 1400 can be accomplished using a pin rotation mechanism comprising a rotatable input 5004 operatively coupled to the motor 3027, an input cam 5006 (shown in detail in FIG. 78) having a top end portion 5008 engaged with the rotatable input 5004, and a cycloid assembly 5010 (shown in detail in FIG. 71) operatively coupled to the input cam 5006. Input cam 5006 further includes a bottom portion 5009. A distal link face 5003 (shown in detail in FIGS. 79 and 80) of the first link 1100 is operatively coupled to the cycloid assembly 5010 such that rotation of the cycloid assembly 5010 lifts the end face 5002 of the first link 1100 out of engagement from the second link 1400. In an exemplary embodiment, end face 5002 of first link 1100 can include a plurality of curvic teeth 5012 in releasable engagement with a plurality of curvic teeth 5014 in second link 1400.

End face 5002 has a set of radially outward curvic teeth 5060 that engage with curvic teeth 5032 in distal link face 5003, while the set of radially inward curvic teeth 5012 are in releasable engagement with second link 1400. The set of radially outward curvic teeth 5060 are shorter than the set of radially inward curvic teeth 5012.

In an exemplary embodiment, the rotatable input 5004 comprises a hollow shaft 5015 having a generally eccentric spherical output 5016. Shaft 5015 rides inside of a bearing 5017 inside link 1100.

Figure 76:
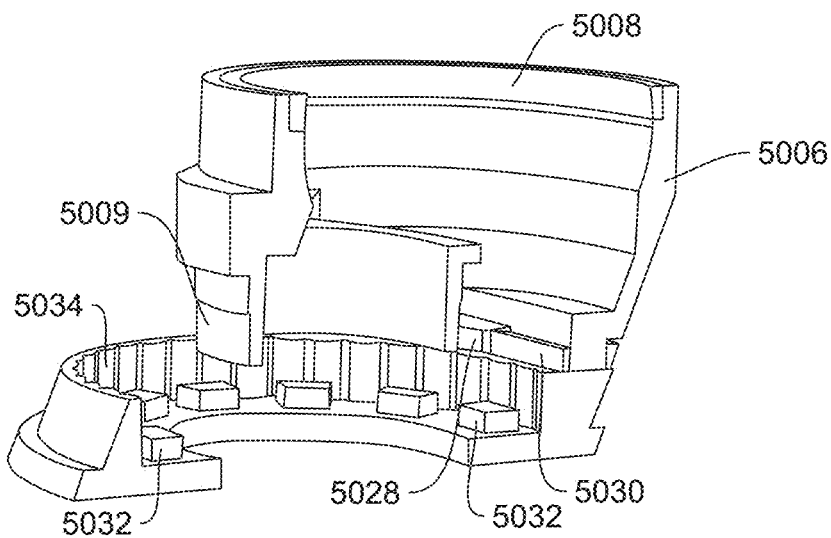
FIG. 76 is a perspective view, in section of an input cam and distal end face of the actuator of FIG. 67.
Figure 77:
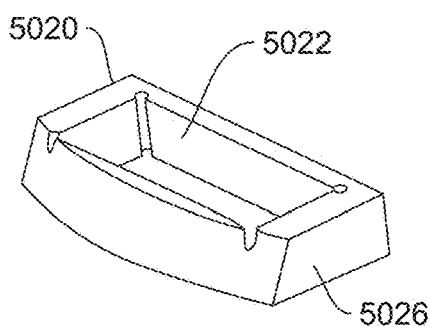
FIG. 77 is a perspective view of a guide block used I the actuator of FIG. 67.
Figure 78:
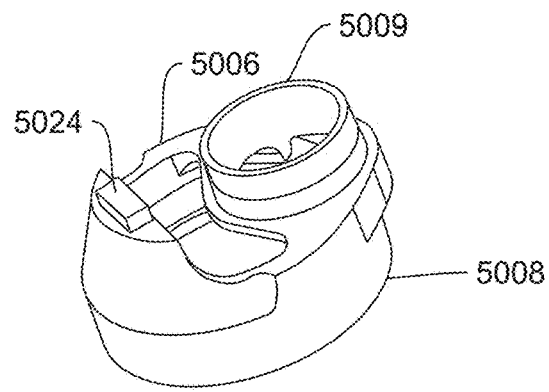
FIG. 78 is a bottom perspective of the input cam of FIG. 76.
Figure 79:
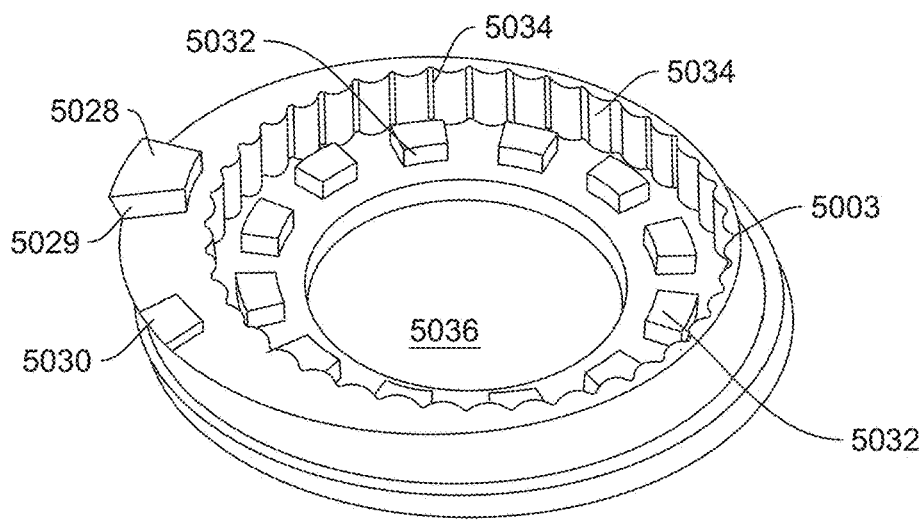
FIG. 79 is a perspective view of a pin face used in thee actuator of FIG. 67.

The input cam 5006 is operationally attached to the spherical output 5016. Referring to FIGS. 77-79, the input cam 5006 has a slotted key 5020 that has an interior surface 5022 configured to engage a key input 5024 on the bottom of input cam 5006. Key 5020 also has an exterior surface 5026 configured to rest in a receiver 5029 and engage a pair of spaced outcrops 5028, 5030 on distal link face 5003. The key input 5024 restricts movement of the key 5020 in a first direction. The spaced outcrops 5028, 5030 restrict movement of the key 5020 in a second direction, orthogonal to the first direction. The resulting X and Y translation precludes any rotational movement of assembly 3030, as shown in FIG. 76.

Figure 80:
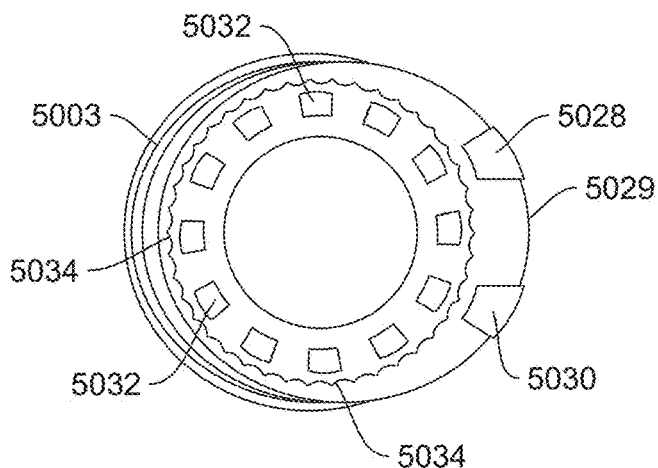
FIG. 80 is a top plan view of the pin face of FIG. 79.
Figure 81:
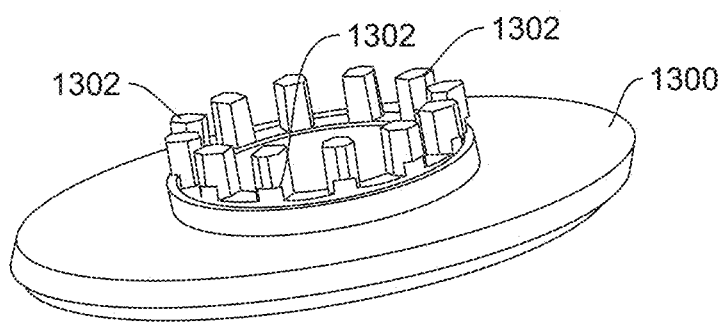
FIG. 81 is a perspective view of a proximal link face of an link adjacent the actuator of FIG. 67.
Figure 82:
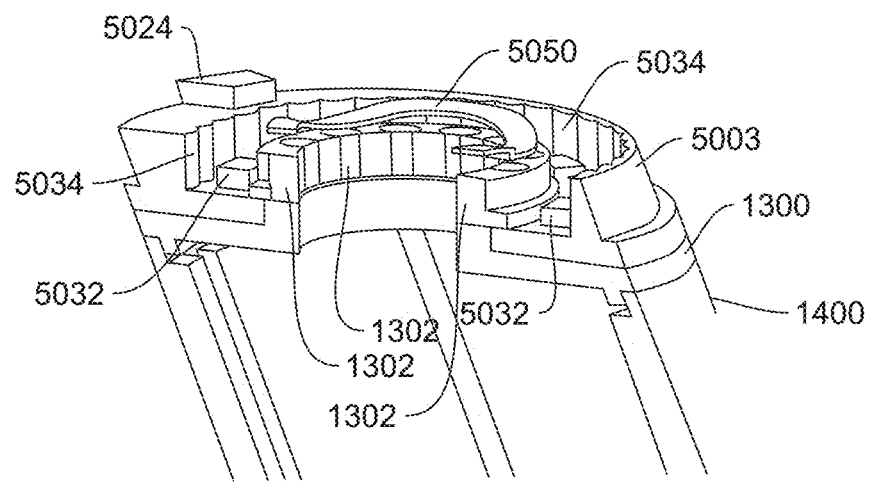
FIG. 82 is a perspective view, in section, of a distal end of the actuator of FIG. 67 on a second link.
Figure 83:
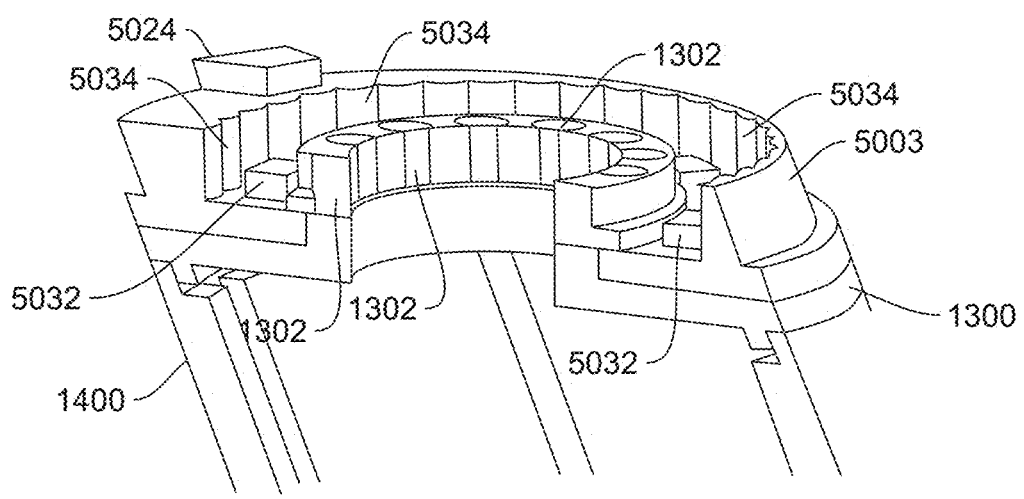
FIG. 83 is an enlarged perspective view of the distal end of the actuator of FIG. 82, with the wave spring removed.

Referring to FIGS. 79 and 80, distal link face 5003 comprises a plurality of radially spaced pin face curvic teeth 5032 extending radially upwardly therefrom and a plurality of radially inwardly extending cycloid teeth 5034. As shown in FIG. 80, a through-opening 5036 is eccentrically located within distal link face 5003.

Figure 74:
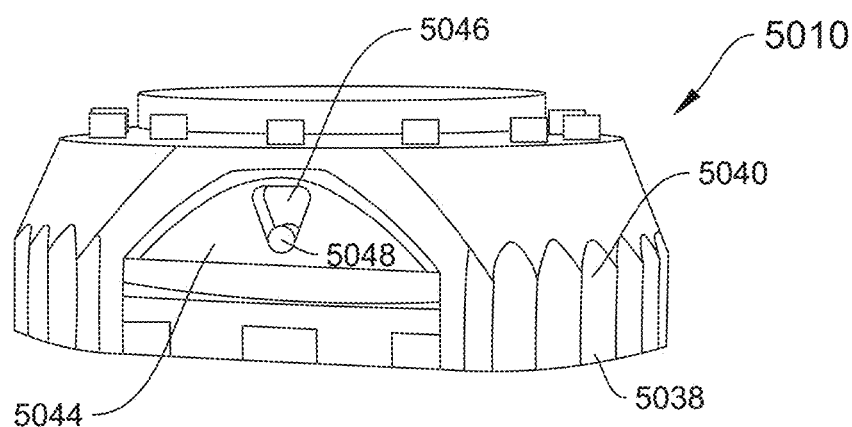
FIG. 74 is a side elevational view, partially in section, of a rotor assembly used in the actuator of FIG. 67.
Figure 75:
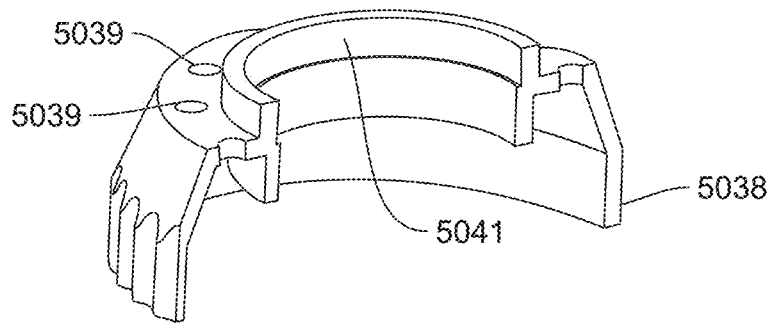
FIG. 75 is a is a perspective view, in section, of the rotor of FIG. 74.

Referring to FIGS. 74 and 75, the cycloid assembly 5010 comprises a rotor 5038 having a plurality of radially outwardly extending cycloid teeth 5040 configured to engage the radially inwardly extending cycloid teeth 5034. The cycloid assembly 5010 also includes output disk 5044, shown in detail in FIG. 71, with the rotor 5038 mounted on top of the output disk 5044, as shown in FIG. 74.

Rotor 5038 also includes a plurality of top radially spaced openings 5039 that allow for the passage of vertically extending pins 5011 in top of end face 5002 to extend therethough. Pins 5011 transfer the eccentric motion of rotor 5038 into gear reduced output. Pins 5011 will move around in the openings 5039 to achieve steady rotation of the output shaft from the wobbling movement of the cycloid assembly. Additionally, rotor 5038 includes an inner circular sleeve 5041 that receives bottom portion 5009 of input cam 5006.

Figure 71:
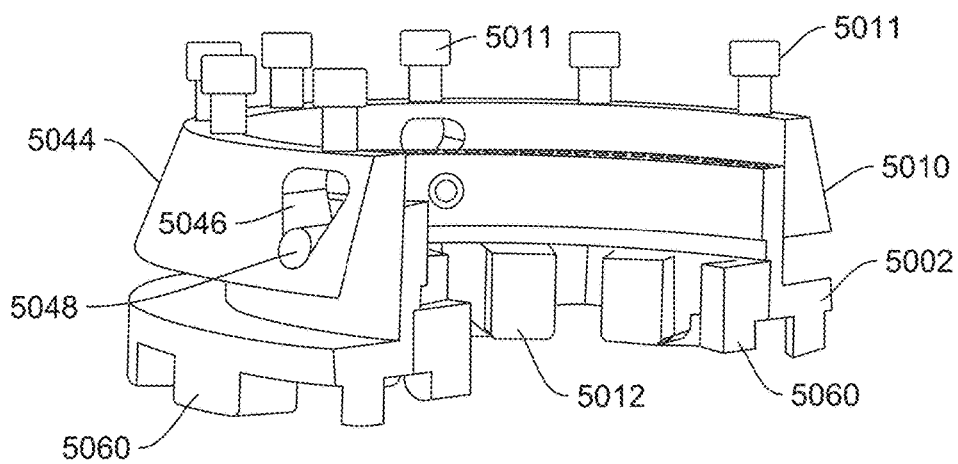
FIG. 71 is a perspective view, in section, of an output disk assembly used in the actuator of FIG. 67.
Figures 72, 73:
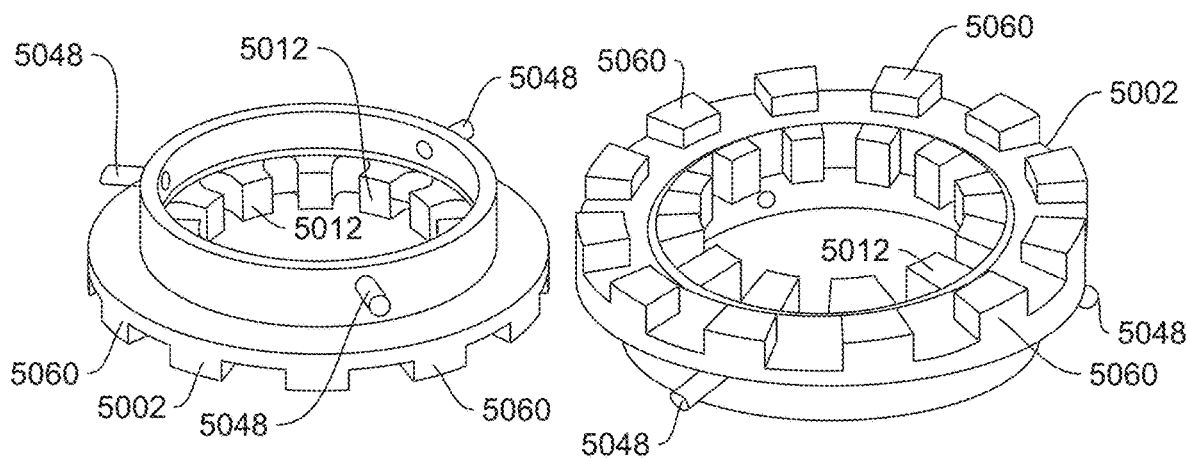
FIG. 72 is a perspective view of an end face of the actuator of FIG. 67.
FIG. 73 is a bottom perspective view of the end face of FIG. 72.

Referring to FIG. 71, output disk 5044 comprises a ramp 5046 and end face includes a pin 5048 extending radially outwardly therefrom. The pin 5048 is movable in the ramp 5046 such that, when the pin 5048 is in a first position in the ramp 5046 the end face 5002 is engaged with the second link 1400 and when the pin 5048 is in a second position in the ramp 5046 the end face 5002 is disengaged from the second link 1400. In an exemplary embodiment, three ramps 5046 and three corresponding pins 5048 are spaced radially around their respective members.

The ramp 5046 comprises an inverted triangle such that, the first position described above for the pin 5048 is in the lower corner of ramp 5046, as shown in FIGS. 71 and 74 and the second position described above for the pin 5048 is along the top side of ramp 5046. A biasing member 5050 in the form of a wave spring biases the rotor 5038 away from the second link 1400.

Second link 1400 includes proximal face 1300 having a plurality of curvic teeth 1302 in releasable engagement with curvic teeth 5012 on end face 5002. When pins 5048 lift end face 5002 to its second position, curvic teeth 1302, 5012 disengage, allowing for rotation of first link 1100 relative to second link 1400.

Figure 84:
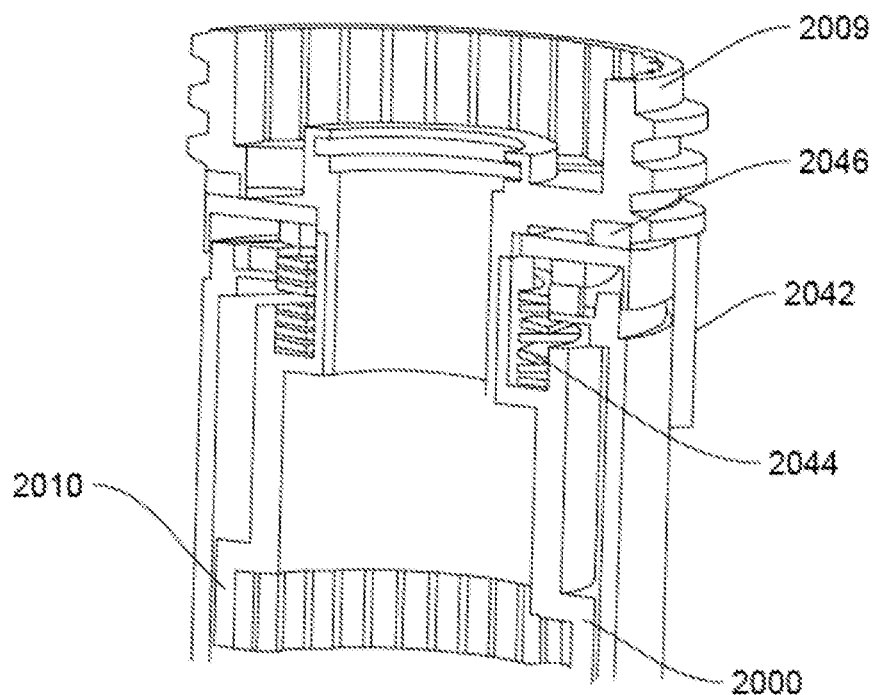
FIG. 84 is a perspective view, in section, of a screw assembly used in the robot of FIG. 55.
Figure 85:
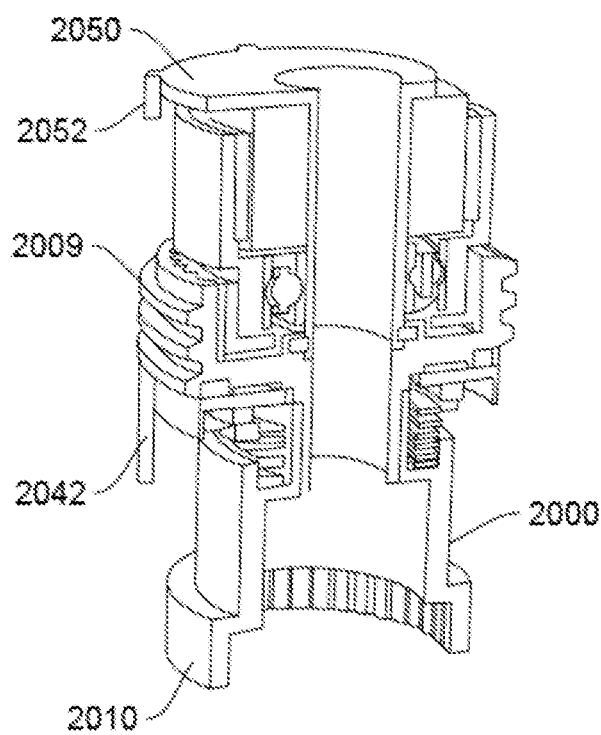
FIG. 85 is a perspective view, in section, of the screw assembly of FIG. 84 mounted onto a motor base.
Figure 86:
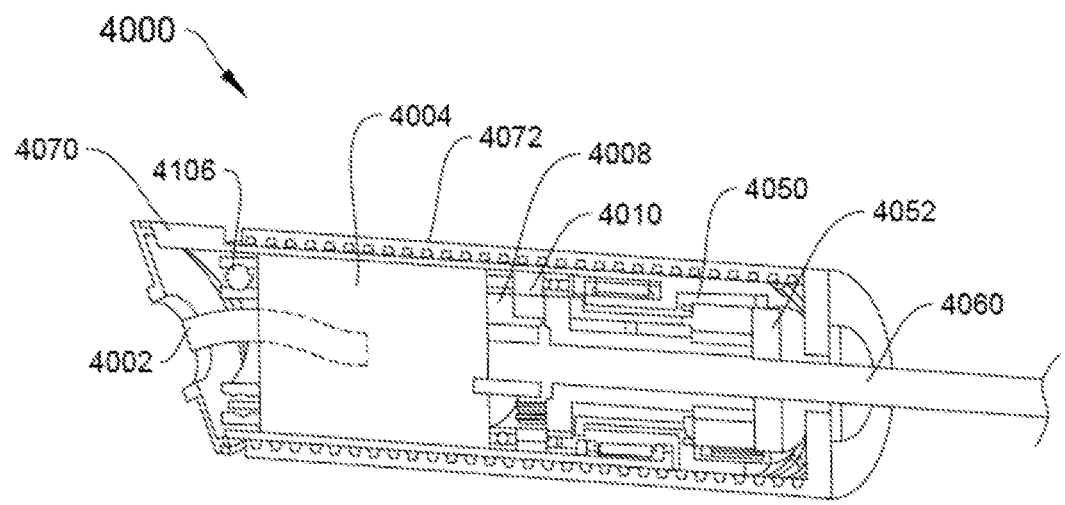
FIG. 86 is a side elevational view, in section, of the robot of FIG. 55, with a distal drill mounted thereon.
Figure 87:
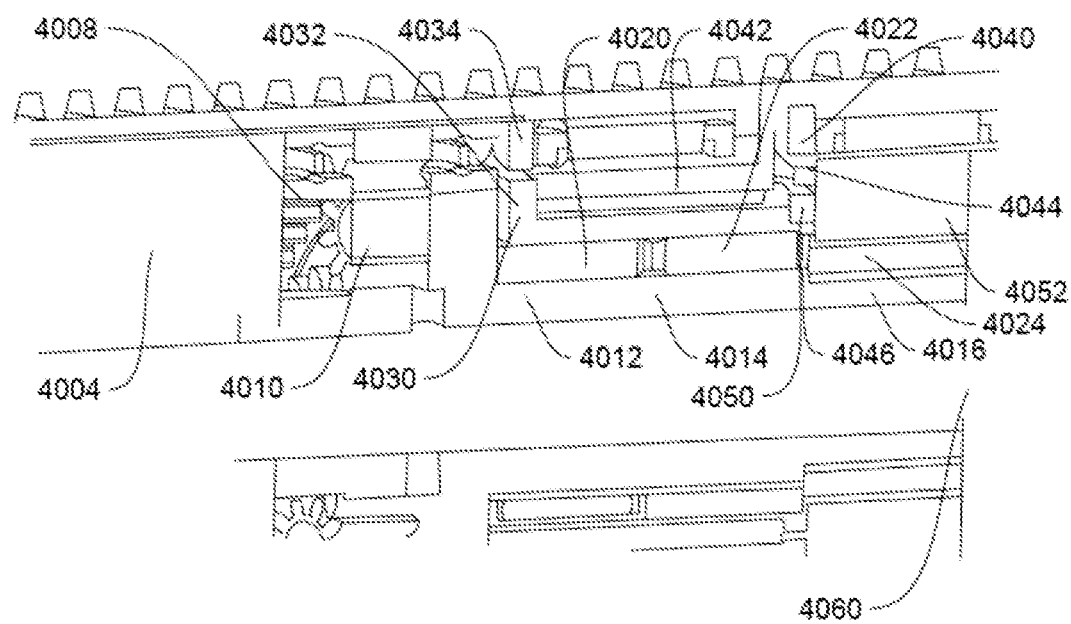
FIG. 87 is a side elevational view, in section, of a gear train assembly for operating the drill bit of FIG. 86.
Figure 88:
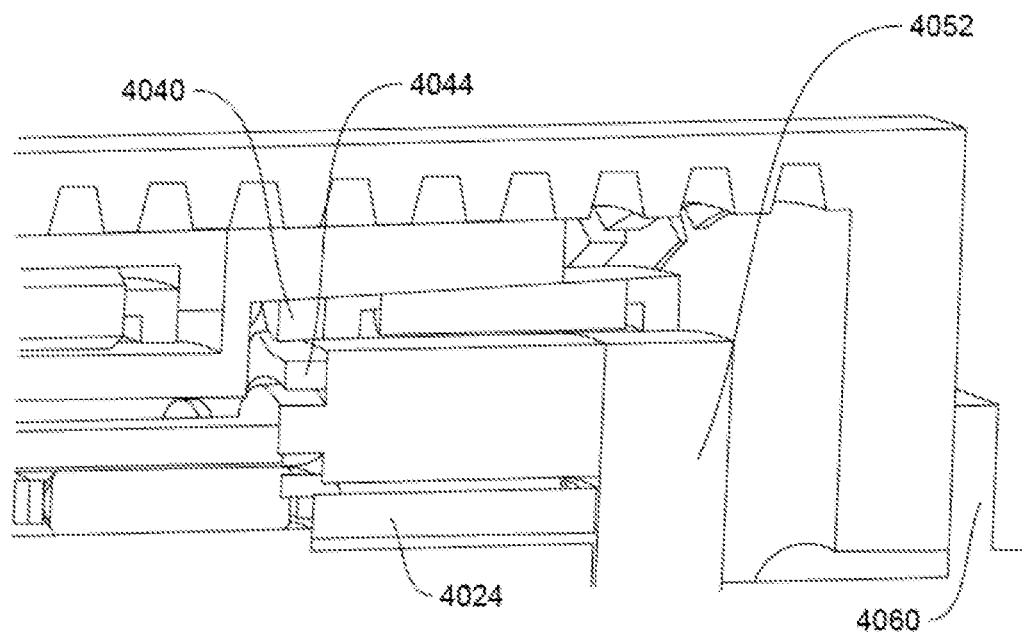
FIG. 88 is a is a perspective view, in section, of a rotor assembly used to drive the drill bit of FIG. 86.
Figure 89:
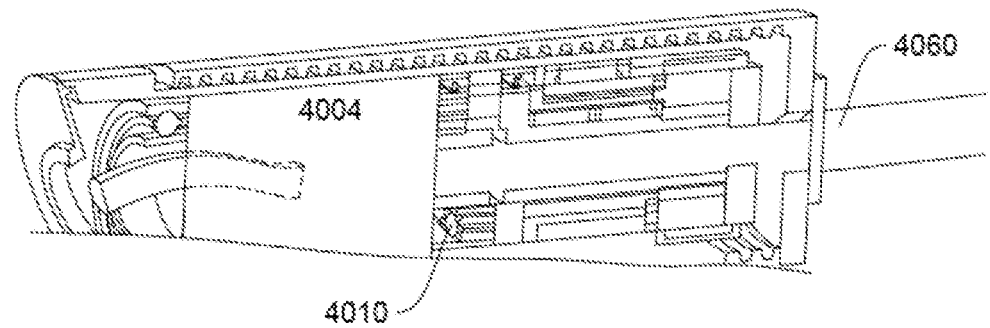
FIG. 89 is a perspective view, in section, of a motor used to drive the drill bit of FIG. 86.
Figure 90:
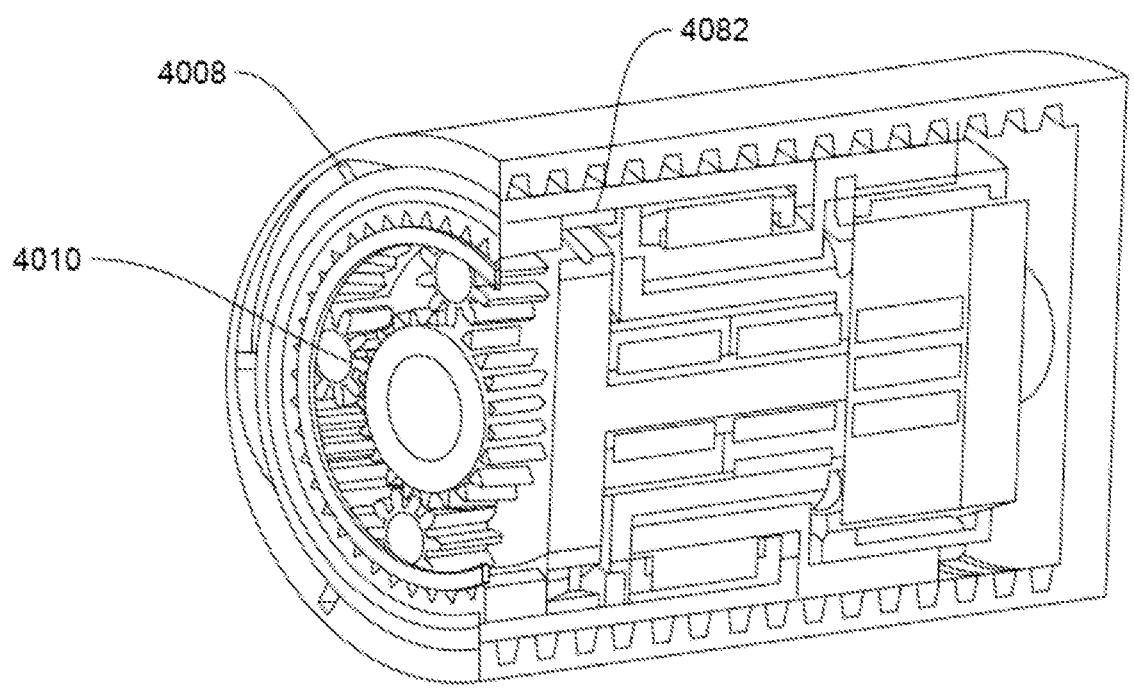
FIG. 90 is a perspective view, in section, of a planetary gear train used to drive the drill bit of FIG. 86.

FIGS. 84 and 85 show robot 2000 coupled to screw 2009. Tangs 2042 engage a sleeve (not shown) having corresponding slots such that movement of screw 2009 with respect to robot 2000 extends screw 2009. A spring 2044 biases teeth 2046 up/down as shown in FIG. 84.

Referring to FIG. 85, a motor base 2050 is mounted on screw 2009. Tangs 2052 extend into the aforementioned slots to prevent motor base 250 from rotating.

Referring now to FIGS. 86-90, a drill head assembly 4000 is shown. Drill head assembly 4000 includes a drive shaft 4002 is connected to a motor 4004. A bearing 4106 supports both drive shaft 4002 and motor 4004. Additionally, a bearing 4008 also supports motor 4004. A planetary gear train 4010 at the output end of motor 4004 slows down the rotational speed of motor output from 30,000 RPM to about 10,000 RPM. The planets of planetary gear 4010 are connected to output 4012. Output 4012 includes a central eccentric portion 4014 supported by bearings 4020, 4022 and a concentric output portion 4016 supported by a bearing 4024.

A rotor 4030 has an inner profile at an input end 4032 periodically engages a cycloid 4034, further reducing the output speed to about 333 RPM (about a 30:1 reduction). A second inner profile 4040 on rotor 4030 further reduces the output speed at a ratio of about 31:1, slowing the rotation of screw 4042. Rotor 4044 includes a plurality of radial holes 4046. Pins 4050 inside holes 4046 reduce rotational speed about 30:1. Pins 4050 are connected to sleeve 4052. Sleeve 4052 is not-rotationally coupled to drill bit 4060 so that, as sleeve 4052 rotates, drill bit 4060 also rotates.

Optionally, although not shown, a break-away mechanism, such as a ball detent, can be located within sleeve 4052 to allow drill bit 4060 to break away in the event of over-torquing. Still optionally, a camera (not shown) can be mounted on external housing 4072 at input end 4070 or other suitable location. The camera can be used to see the environment around robot 4000.

Pins 4080 on sleeve 4082 engage a slot (not shown) inside housing 4072 to longitudinally translate housing 4072 with respect to sleeve 4082.

It will be further understood that various changes in the details, materials, and arrangements of the parts which have been described and illustrated in order to explain the nature of this invention may be made by those skilled in the art without departing from the scope of the invention as expressed in the following claims.

What I claim is:

1. An actuator assembly in a robot, the robot having a first link operationally attached to a second link, the assembly configured to rotate the first link relative to the second link, the assembly comprising:
   a motor configured to:
   lift an end face of the first link out of engagement with the second link;
   rotate the first link relative to the second link; and
   lower the end face of the first link into engagement with the second link;
   and
   a pin rotation mechanism comprising:
   a rotatable input coupled to the motor;
   an input cam having a top end portion engaged with the rotatable input; and
   a cycloid assembly operatively coupled to the input cam,
   wherein the end face of the first link is operatively coupled to the cycloid assembly such that rotation of the cycloid assembly lifts the end face of the first link out of engagement from the second link;
   wherein the rotatable input comprises a shaft having a spherical output, and wherein the pin rotation mechanism further comprises:
   the input cam operationally attached to the spherical output, the input cam having a slotted key, the slotted key having an interior surface configured to engage a key input and an exterior surface configured to engage a pair of spaced outcrops on the end face of the first link, wherein the key input restricts movement of the key in a first direction and wherein the spaced outcrops restrict movement of the key in a second direction, orthogonal to the first direction.

2. The actuator assembly according to claim 1, wherein the spherical output is eccentrically mounted on the shaft.

3. The actuator assembly according to claim 2, wherein the end face of the first link comprises a plurality of radially spaced pin face curvic teeth extending radially upwardly therefrom.

4. The actuator assembly according to claim 3, wherein the end face of the first link further comprises a plurality of radially inwardly extending cycloid teeth.

5. The actuator assembly according to claim 4, wherein the cycloid assembly comprises a rotor having a plurality of radially outwardly extending cycloid teeth configured to engage the radially inwardly extending cycloid teeth.

6. The actuator assembly according to claim 5, wherein the cycloid assembly further comprises an output disk, with the rotor mounted on a top of the output disk.

7. The actuator assembly according to claim 6, wherein the output disk comprises a ramp and wherein the end face of the first link comprises a pin, the pin being movable in the ramp such that, when the pin is in a first position in the ramp the end face of the first link is engaged with the second link and when the pin is in a second position in the ramp the end face of the first link is disengaged from the second link.

8. The actuator assembly according to claim 7, wherein the ramp comprises an inverted triangle.

9. The actuator assembly according to claim 5, wherein the cycloid assembly further comprises a biasing member biasing the rotor away from the second link.

10. The actuator assembly according to claim 1, wherein the end face of the first link comprises a set of radially outward curvic teeth and a set of radially inward curvic teeth.

11. The actuator assembly according to claim 10, wherein the set of radially outward curvic teeth are shorter than the set of radially inward curvic teeth.

12. The actuator according to claim 1, wherein the rotatable input rides inside of a bearing.

13. The actuator assembly according to claim 1, further comprising a through passage between the motor and the end face of the first link.

\* \* \* \* \*